(12) United States Patent
Pillai et al.

(10) Patent No.: US 10,472,956 B2
(45) Date of Patent: Nov. 12, 2019

(54) MUD PULSE TELEMETRY

(71) Applicant: HALLIBURTON ENERGY SERVICES, INC., Houston, TX (US)

(72) Inventors: Bipin K. Pillai, Tomball, TX (US); Laban M. Marsh, Houston, TX (US); James H. Dudley, Spring, TX (US); Ronald L. Spross, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/468,554

(22) Filed: Mar. 24, 2017

(65) Prior Publication Data

US 2017/0198569 A1 Jul. 13, 2017

Related U.S. Application Data

(62) Division of application No. 14/510,801, filed on Oct. 9, 2014, now Pat. No. 9,638,033, which is a division of application No. 13/700,254, filed as application No. PCT/US2010/039312 on Jun. 21, 2010, now Pat. No. 8,880,349.

(51) Int. Cl.
| | |
|---|---|
| *E21B 47/18* | (2012.01) |
| *G01V 1/50* | (2006.01) |
| *E21B 49/00* | (2006.01) |
| *G06F 19/00* | (2018.01) |
| *G01V 11/00* | (2006.01) |
| *G01V 9/00* | (2006.01) |
| *H04L 12/825* | (2013.01) |
| *E21B 21/08* | (2006.01) |

(52) U.S. Cl.
CPC .............. *E21B 47/18* (2013.01); *E21B 21/08* (2013.01); *E21B 49/003* (2013.01); *G01V 1/50* (2013.01); *G01V 9/00* (2013.01); *G01V 11/002* (2013.01); *G06F 19/00* (2013.01); *H04L 47/25* (2013.01)

(58) Field of Classification Search
CPC ........ E21B 21/08; E21B 47/18; E21B 49/003; G01V 11/002; G01V 1/50; G01V 9/00; G06F 19/00; H04L 47/25
USPC .......................... 702/9, 138; 342/83; 367/83
See application file for complete search history.

(56) References Cited

U.S. PATENT DOCUMENTS

| | | |
|---|---|---|
| 3,904,840 A | 9/1975 | Kostelnicek |
| 4,003,435 A | 1/1977 | Cullen et al. |
| 4,181,184 A | 1/1980 | Scherbatskoy |

(Continued)

FOREIGN PATENT DOCUMENTS

| | | |
|---|---|---|
| CN | 85108732 A | 4/1987 |
| CN | 1096100 A | 12/1994 |

(Continued)

OTHER PUBLICATIONS

Extended Search Report issued for European Application No. 10853782.0 dated Apr. 13, 2016, 5 pages.

(Continued)

*Primary Examiner* — John H Le
(74) *Attorney, Agent, or Firm* — Haynes and Boone, LLP

(57) ABSTRACT

Mud pulse telemetry. The various embodiments are directed to methods and systems of encoding data in a mud pulse telemetry system, where at least a portion of the data is encoded the time between pressure transitions. Moreover, the various embodiments are directed to detection methods and systems that detect the pressure transitions at the surface.

8 Claims, 19 Drawing Sheets

(56) References Cited

U.S. PATENT DOCUMENTS

| | | | |
|---|---|---|---|
| 4,534,424 A | 8/1985 | Ramsey | |
| 4,787,093 A | 11/1988 | Rorden | |
| 5,272,680 A | 12/1993 | Stone et al. | |
| 5,363,095 A | 11/1994 | Normann et al. | |
| 5,459,697 A | 10/1995 | Chin et al. | |
| 5,490,121 A | 2/1996 | Gardner et al. | |
| 5,517,464 A | 5/1996 | Lerner et al. | |
| 5,969,638 A | 10/1999 | Chin | |
| 6,041,872 A | 3/2000 | Holcomb | |
| 6,370,082 B1 | 4/2002 | Gardner et al. | |
| 6,421,298 B1 | 7/2002 | Beattie et al. | |
| 6,457,538 B1 | 10/2002 | Pittard et al. | |
| 6,788,219 B2 | 9/2004 | Sun et al. | |
| 6,963,290 B2 | 11/2005 | Marsh et al. | |
| 6,975,244 B2 | 12/2005 | Hahn et al. | |
| 7,324,010 B2 | 1/2008 | Gardner et al. | |
| 7,348,892 B2 | 3/2008 | Rodney | |
| 7,350,589 B2 | 4/2008 | Head | |
| 7,416,028 B2 | 8/2008 | Prendin et al. | |
| 7,480,207 B2 | 1/2009 | Marsh | |
| 8,880,349 B2 | 11/2014 | Pillai et al. | |
| 2003/0016164 A1 | 1/2003 | Finke et al. | |
| 2004/0100866 A1 | 5/2004 | Marsh et al. | |
| 2007/0177461 A1 | 8/2007 | Marsh | |
| 2007/0263488 A1 | 11/2007 | Clark | |
| 2008/0037369 A1 | 2/2008 | Hentati | |
| 2008/0204270 A1 | 8/2008 | Aiello et al. | |
| 2009/0132458 A1 | 5/2009 | Edwards et al. | |

FOREIGN PATENT DOCUMENTS

| | | |
|---|---|---|
| CN | 1657742 A | 8/2005 |
| EP | 0681090 | 11/1995 |
| EP | 0697499 | 2/1996 |
| GB | 2121572 A | 12/1983 |
| GB | 2370590 | 7/2002 |
| WO | WO 2001/046548 A2 | 6/2001 |
| WO | WO 2009/008862 | 1/2009 |

OTHER PUBLICATIONS

Extended Search Report issued for European Application No. 13153076.8 dated Apr. 7, 2016, 7 pages.

Extended Search Report issued for European Application No. 13153072.7 dated Apr. 7, 2016, 7 pages.

Extended Search Report issued for European Application No. 13153079.2 dated Apr. 7, 2016, 5 pages.

Extended Search Report issued for European Application No. 13153092.5 dated Apr. 7, 2016, 7 pages.

International Search Report and Written Opinion issued Mar. 17, 2011 in International Patent Application No. PCT/US2010/039312.

Monroe, et al., "Applying Digital Data-Encoding Techniques to Mud Pulse Telemetry," Society of Petroleum Engineers Fifth Petroleum Computer Conference, Jun. 25-28, 1990, pp. 7-16, Denver, Colorado (SPE 20326).

Notice on the First Office Action and Search Report, Dec. 1, 2014, 1-5, The State Intellectual Property of The People's Republic of China.

Search Report and Office Action issued for Brazilian Patent Application No. 122012033441-3, dated May 28, 2019, 2 pages.

Search Report and Office Action issued for Brazilian Patent Application No. 122012033447-2, dated May 28, 2019, 4 pages.

Smith, The Scientist and Engineer's Guide to Digital Signal Processing, DSPguide.com, $2^{nd}$ Edition, 1999, pp. 277-282.

Substantive Examination Adverse Report, Oct. 15, 2015, 4 pages, Intellectual Property Corporation of Malaysia.

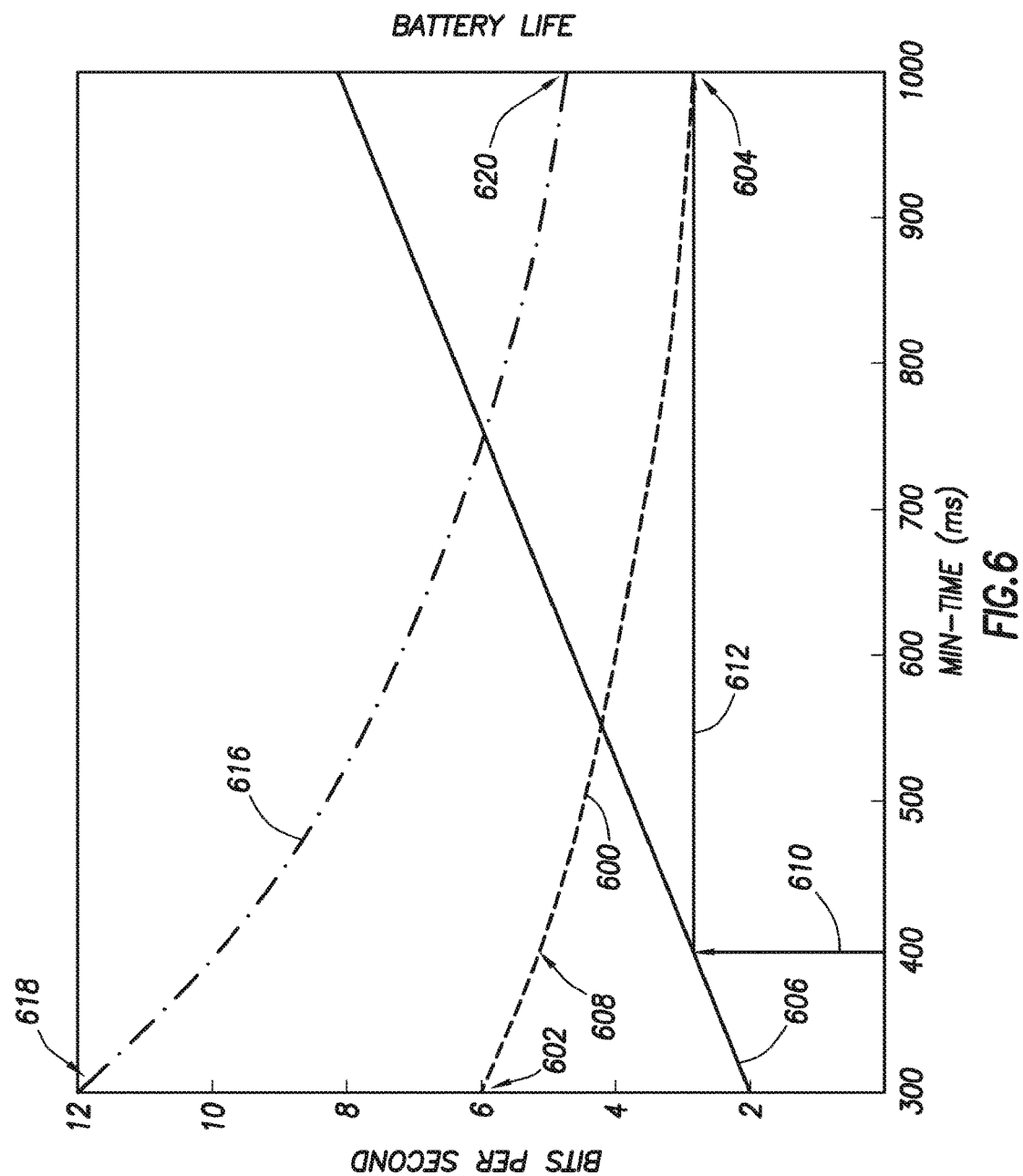

MUD PULSE TELEMETRY

PRIORITY

The present application is a divisional patent application of U.S. patent application Ser. No. 14/510,801, filed on Oct. 9, 2014, which is a divisional patent application of U.S. patent application Ser. No. 13/700,254, filed on Nov. 27, 2012, which is a U.S. National Stage patent application of International Patent Application No. PCT/US2010/039312, filed on Jun. 21, 2010, the benefits of which are claimed and disclosures of which are hereby incorporated by reference in their entirety.

BACKGROUND

Hydrocarbon drilling and production operations demand a great quantity of information relating to parameters and conditions downhole. Such information may comprise characteristics of the earth formations traversed by the borehole, along with data relating to the size and configuration of the borehole itself. The collection of information relating to conditions downhole is termed "logging."

Drillers often log the borehole during the drilling process, thereby eliminating the necessity of removing or "tripping" the drilling assembly to insert a wireline logging tool to collect the data. Data collection during drilling also enables the driller to make accurate modifications or corrections as needed to steer the well or optimize drilling performance while minimizing down time. Designs for measuring conditions downhole including the movement and location of the drilling assembly contemporaneously with the drilling of the well have come to be known as "measurement-while-drilling" techniques, or "MWD". Similar techniques, concentrating more on the measurement of formation parameters, commonly have been referred to as "logging while drilling" techniques, or "LWD". While distinctions between MWD and LWD may exist, the terms MWD and LWD often are used interchangeably. For purpose of this disclosure, the term LWD will be used with the understanding that this term encompasses both the collection of formation parameters and the collection of information relating to the movement and position of the drilling assembly.

In LWD systems, sensors in the drill string measure the desired drilling parameters and formation characteristics. While drilling is in progress these sensors continuously or intermittently transmit the information to a surface detector by some form of telemetry. Most LWD systems use the drilling fluid (or mud) in the drill string as the information carrier, and are thus referred to as mud pulse telemetry systems. In positive-pulse systems, a valve or other form of flow restrictor creates pressure pulses in the fluid flow by adjusting the size of a constriction in the drill string. In negative-pulse systems, a valve creates pressure pulses by releasing fluid from the interior of the drill string to the annulus. In both system types, the pressure pulses propagate at the speed of sound through the drilling fluid to the surface, where they are detected various types of transducers.

Data transfer rates in mud pulse telemetry systems are relatively low, on the order of five bits per second or less of actual downhole data. Moreover, downhole devices that operate as negative-pulse systems draw power to operate the valve or valves that create the pressure pulses from a battery system with limited energy storage capacity. Thus, any method or system that either increases the effective data transfer rate, or provides for longer battery life (whether at existing data transfer rates or increased data transfer rates), would provide a competitive advantage in the marketplace.

BRIEF DESCRIPTION OF THE DRAWINGS

For a detailed description of exemplary embodiments, reference will now be made to the accompanying drawings in which:

FIG. 6 shows a graph that relates the number of bits per second modulated as pressure pulses of the drilling fluid, MIN-TIME for pulses, and the number of days to exhaust battery life;

NOTATION AND NOMENCLATURE

Figure 1:
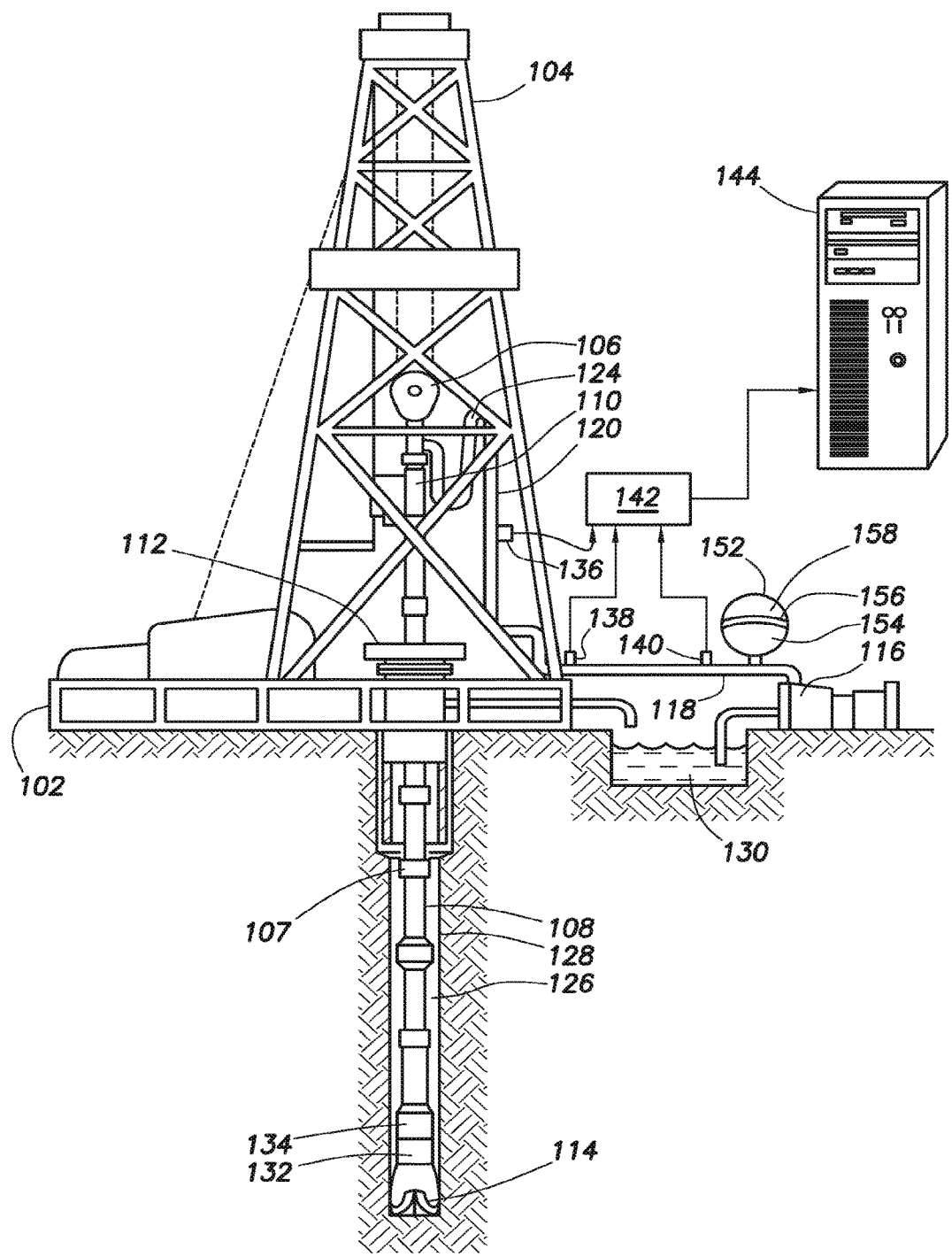
FIG. 1 shows a drilling system in accordance with at least some embodiments.

Certain terms are used throughout the following description and claims to refer to particular system components. As one skilled in the art will appreciate, oil field service companies may refer to components by different names. This document does not intend to distinguish between components that differ in name but not function.

In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection or through an indirect connection via other devices and connections.

"Pressure transitions" shall mean communicative changes in pressure of drilling fluid within a drill string caused by operation of a valve that selectively controls flow of the drilling fluid. Changes in pressure of drilling fluid within a drill string caused by non-communicative noise sources, such as bit noise, bit-jet noise, drill string torque noise and mud-pump noise, shall not be considered pressure transitions.

"Negative pressure transition" shall mean a change in pressure of the drilling fluid where the drilling fluid is initially at a particular baseline pressure, and the pressure of the drilling fluid then changes to a lower pressure, though not necessarily a negative pressure.

"Positive pressure transition" shall mean a change in pressure of the drilling fluid where the drilling fluid is initially at a particular baseline pressure, and the pressure of the drilling fluid then changes to a higher pressure.

"Pressure pulse" shall mean a first pressure transition to a changed drilling fluid pressure, followed by a second pressure transition to substantially the original drilling fluid pressure. For example, in negative-pulse systems a pressure pulse comprises a negative pressure transition, a period of time at a lower drilling fluid pressure, followed by a positive pressure transition. As yet another example, in positive-pulse systems a pressure pulse comprises a positive pressure transition, a period of time at a higher drilling fluid pressure, followed by a negative pressure transition.

"Amount of time between coherent features" of two pressure pulses shall mean that time measurement between two pressure pulses is based on the same feature in each pressure pulse (e.g., the time between leading pressure transitions of the pressure pulses, time between trailing pressure transitions, or the time between the centers of the pressure pulses).

"Reflective device" shall be any device or structure that causes pressures pulses propagating in a pipe in a first direction to reflect and propagate opposite the first direction, whether the reflection is a positive reflection or negative reflection. For example, a desurger and/or mud pump are considered reflective devices.

"Pulse length" shall refer to a distance between the leading pressure transition of a pressure pulse in drilling fluid and the trailing pressure transition of the pressure pulse.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The various embodiments are directed to mud pulse telemetry methods and systems. The methods and systems include a plurality of encoding techniques where data is encoded, at least in part, as the time between pressure transitions of pressure pulses in the drilling fluid. Moreover, the various embodiments are directed to a plurality of pressure transition methods and systems to detect the pressure transitions in the drilling fluid with varying pulse lengths (corresponding to pulse time durations) and physical constraints on surface detection equipment.

FIG. 1 shows a well during drilling operations. A drilling platform 102 is equipped with a derrick 104 that supports a hoist 106. Drilling of hydrocarbon wells is carried out by a string of drill pipes connected together by "tool" joints 107 so as to form a drill string 108. The hoist 106 suspends a top drive 110 that is used to rotate the drill string 108 and to lower the drill string through the wellhead 112. Connected to the lower end of the drill string 108 is a drill bit 114. The drill bit 114 is rotated and drilling accomplished by rotating the drill string 108, by use of a downhole motor near the drill bit, or by both methods. Drilling fluid is pumped by mud pump 116 through flow line 118, stand pipe 120, goose neck 124, top drive 110, and down through the drill string 108 at high pressures and volumes to emerge through nozzles or jets in the drill bit 114. The drilling fluid then travels back up the borehole via the annulus 126 formed between the exterior of the drill string 108 and the borehole wall 128, through a blowout preventer (not specifically shown), and into a mud pit 130 on the surface. On the surface, the drilling fluid is cleaned and then circulated again by mud pump 116. The drilling fluid is used to cool the drill bit 114, to carry cuttings from the base of the bore to the surface, and to balance the hydrostatic pressure in the rock formations.

In wells employing mud pulse telemetry for logging while drilling ("LWD"), downhole tools 132 collect data regarding the formation properties and/or various drilling parameters. The downhole tools 132 are coupled to a telemetry module 134 that transmits the data to the surface. Telemetry module 134 modulates a resistance to drilling fluid flow to generate pressure pulses that propagate at the speed of sound to the surface. Various transducers, such as transducers 136, 138 and 140, convert the pressure signal into electrical signals for a signal digitizer 142 (e.g., an analog to digital converter). While three transducers 136, 138 and 140 are illustrated, a greater number of transducers, or fewer transducers, may be used in particular situations (discussed more thoroughly below). The digitizer 142 supplies a digital form of the pressure signals to a computer 144 or some other form of a data processing device. Computer 144 operates in accordance with software (which may be stored on a computer-readable storage medium) to process and decode the received signals. The resulting telemetry data may be further analyzed and processed by computer 144 to generate a display of useful information. For example, a driller could employ computer system 144 to obtain and monitor bottom hole assembly (BHA) position and orientation information, drilling parameters, and formation properties.

Telemetry module 134 generates a traveling pressure signal representative of measured downhole parameters. In an ideal system, each and every pressure pulse created downhole would propagate upstream and be easily detected by a transducer at the surface. However, drilling fluid pressure fluctuates significantly and contains noise from several sources (e.g., bit noise, torque noise, and mud pump noise). Bit noise is created by vibration of the drill bit during the drilling operation. As the bit moves and vibrates, the drilling fluid exit ports in the bit can be partially or momentarily restricted, creating a high frequency noise in the pressure signal. Torque noise is generated downhole by the action of the drill bit sticking in a formation, causing the drill string to torque up. The subsequent release of the drill bit relieves the torque on the drilling string and generates a low frequency, high amplitude pressure surge. Finally, the mud pump 116 creates cyclic noise as the pistons within the pump force the drilling fluid into the drill string.

Most drilling systems contain a dampener or desurger 152 to reduce noise. Flow line 118 couples to a drilling fluid chamber 154 in desurger 152. A diaphragm or separation membrane 156 separates the drilling fluid chamber 154 from a gas chamber 158. Desurger manufactures recommend that the gas chamber 158 be filled with nitrogen at approximately 50 to 75% of the operating pressure of the drilling fluid. The diaphragm 156 moves with variations in the drilling fluid pressure, enabling the gas chamber to expand and contract, thereby absorbing some of the pressure fluctuations. While the desurger 152 absorbs some pressure fluctuations, the desurger 152 and/or mud pump 116 also act as reflective devices. That is, pressure pulses propagating from the telemetry module 134 tend to reflect off the desurger 152 and/or mud pump 116, sometimes a negative reflection, and propagate back downhole. The reflections create interference that, in some cases, adversely affects the ability to determine the presence of the pressure pulses propagating from the telemetry module 134.

Figure 2:
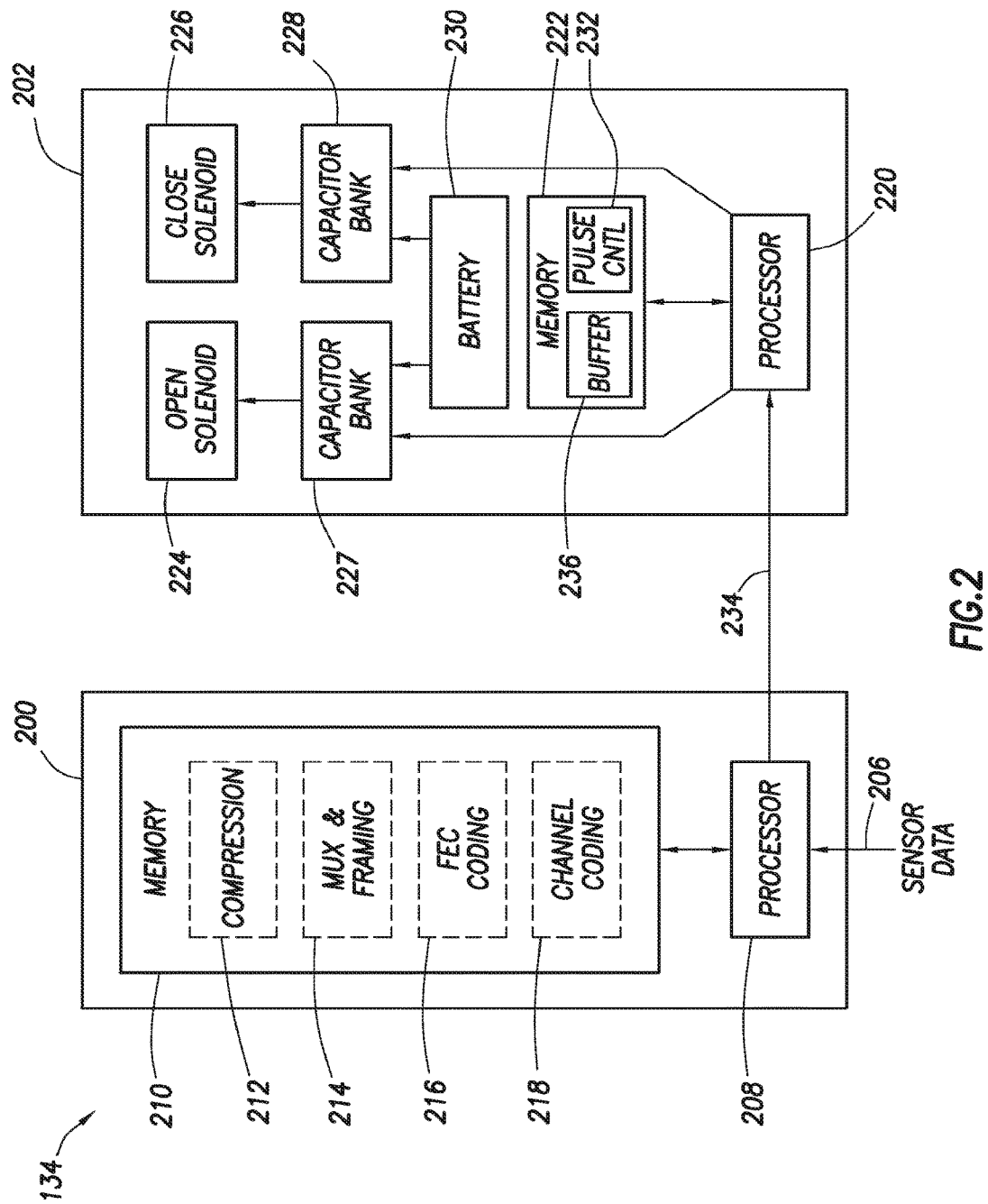
FIG. 2 shows a block diagram of a telemetry module in accordance with at least some embodiments.

FIG. 2 shows, in electrical block diagram form, the telemetry module 134. The telemetry module 134 comprises two logical sections, a communication section 200 and a pulse control section 202. While in some embodiments the communication section 200 and pulse control section 202 are co-located in a single physical device, in other embodiments the communication section 200 and pulse control section 202 are embodied in separate physical devices that are mechanically and electrically coupled together. The various downhole tools 132 provide sensor data 206 to the communication section 200, and in particular to processor 208 (e.g., a digital signal processor (DSP)).

The processor 208 operates in accordance with software from memory 210 to represent the sensor data 206 in the form of a digital transmit signal. In particular, the software contained in memory 210 comprises multiple software modules 212-218. Compression module 212 processes the incoming sensor data to reduce the amount of transmitted data, such as by various compression techniques, by eliminating particular data points or by taking representative samples. In some cases, the data stream may be differentially encoded, so that differences between successive values are sent rather than the values themselves. Usually, differential encoding permits a data stream to be represented with fewer bits. Other compression techniques may be equivalently used. Multiplexing and framing module 214 selects sensor data from the various downhole tools to construct a single transmit data stream. The transmit data stream is divided into data blocks that may be accompanied by framing information in some embodiments. The framing information may include synchronization information and/or error correction information from forward error correction (FEC) module 216. Channel coding module 218 converts the digital transmit signal into a set of timings. The precise nature of the set of timings depends on the particular pulse encoding system, examples of which are discussed more below. The processor 208 then communicates the timings to the pulse control section 202.

The pulse control section 202 receives the set of timings, and based thereon induces pressures pulses in the drilling fluid within the drill string 108. The pulse control section 202 in accordance with at least some embodiments comprises a processor 220, memory 222, open solenoid 224, close solenoid 226, two capacitor banks 227 and 228, and battery 230. The processor 220 operates in accordance with software from memory 222, in particular the pulse control module 232, to control creating pulses in the drilling fluid. The processor 220 accepts the set of timings from processor 208 of the communication section 200 across communication pathway 234. The communication pathway 234 may be either a serial or parallel communication pathway. The pulse control module 202 may, in bursts, receive sets of timings from the communication module 200 faster than sets of timings can be implemented. Thus, memory 222 further comprises a buffer 236 in which the processor 220 may place multiple sets of timings, the buffer 234 thereby acting as a queue.

Still referring to FIG. 2, the pulse control section 202 creates pressure pulses in the drilling fluid by control of a valve. In the embodiments illustrated the valve (not specifically shown) is opened by operation of the open solenoid 224, and the valve is closed by operation of the close solenoid 226. Solenoids use relatively high amounts of current to operate, in some cases more instantaneous current than battery 230 can provide. However, the power (voltage times current) used to operate a solenoid is well within the capabilities of battery. To address the current versus power issue, in accordance with at least some embodiments each solenoid 224 and 226 is associated with a capacitor bank 227 and 228, respectively. The battery 230 charges each capacitor bank between uses at a charge rate within the current capability of the battery 230. When the processor 220 commands the valve to open, capacitor bank 227 is electrically coupled to the open solenoid 224, supplying electrical current at sufficiently high rates to operate the solenoid (and open the valve). Likewise, when the processor 220 commands the valve to close, capacitor bank 228 is electrically coupled to the close solenoid 226, supplying electrical current at sufficiently high rates to operate the solenoid (and close the valve).

The valve that physically creates the pressure pulses in the drilling fluid may take many forms. In some cases, the valve may create pressure pulses by temporarily restricting or even blocking flow of the drilling fluid in the drill string. In situations where the drilling fluid is restricted or blocked, an increase in drilling fluid pressure is created (i.e., a positive-pulse system). In yet still other embodiments, the valve may be configured to divert a portion of the drilling fluid out of the drill string into the annulus 126, thus bypassing the drill bit 114. In situations where the drilling fluid is diverted, a decrease in drilling fluid pressure occurs (i.e., a negative-pulse system). Either positive-pulse systems or negative-pulse systems may be used in the various embodiments, so long as the telemetry module 134 can create pressure transitions (lower drilling fluid pressure to higher drilling fluid pressure, and vice versa) with sufficient quickness (e.g., 18 milliseconds (ms)).

The various embodiments are directed to encoding at least some data as the time between transitions in drilling fluid pressure, and detecting the transitions at the surface. In a first embodiment, a pulse position modulation system is modified to encode additional bits as time between pressure transitions of the pulses. In another embodiment, data is encoded solely as the time between pressure transitions. The discussion begins embodiments where a pulse position modulation system is modified to encode additional bits as time between transitions of the pulses.

Figure 3:
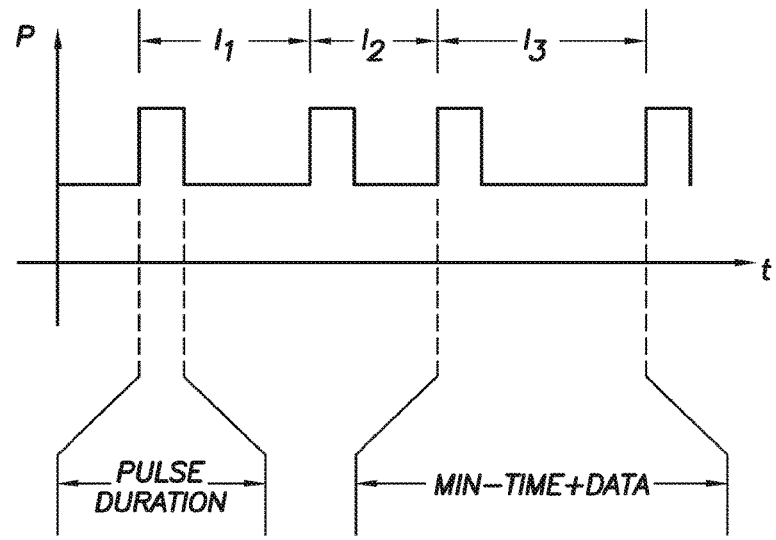
FIG. 3 shows drilling fluid pressure as a function of time, and showing several intervals.

FIG. 3 shows an exemplary graph of drilling fluid pressure as a function of time, which may be measured by the computer system 144 coupled to one of the transducers 136, 138 and/or 140 (FIG. 1). The illustrative graph of FIG. 3 represents an ideal situation where ideal square wave pulses are generated downhole, and are detected as ideal square waves at the surface, FIG. 3 shows the pulses as positive pulses for convenience, but negative pulses are also contemplated. Each pulse has a pulse duration which may range from about 80 ms in some embodiments, to about 400 ms in other embodiments, depending on various parameters of the drilling system. In pure pulse position modulations systems, the pulse durations are substantially constant to aid in detection. However, and as discussed more below, in at least some embodiments a variety of pulse durations may be selectively used (e.g., 50 ms pulses, 100 ms pulses, 150 ms pulses, and 200 ms pulses).

In accordance with the specific embodiment, data is transmitted in intervals, and FIG. 3 shows three such intervals $I_1$, $I_2$ and $I_3$. In the embodiments utilizing pulse position modulation, an interval is the amount of time between coherent features of two consecutive pressure pulses. For example, and as shown, an interval may be an amount of time between leading pressure transitions of each pulse. Alternatively, an interval may be the amount of time between trailing pressure transitions of each pulse, or the amount of time between the centers of each pulse. Each interval has a duration that is at least a minimum time (MIN-TIME). An interval having duration substantially equal to the MIN-TIME encodes a data value zero. The MIN-TIME duration may allow the drilling fluid column to settle after a pressure transition event (allows ringing and other noise in the drilling fluid to dampen out). The MIN-TIME may change for each particular drilling situation, but in most cases ranges from between approximately 0.3 seconds to 2.0 seconds. In some embodiments (e.g., positive-pulse systems), a MIN-TIME of 0.6 seconds may be used. In other embodiments (e.g., negative-pulse systems) a MIN-TIME of 1.0 seconds may be used.

Figure 4:
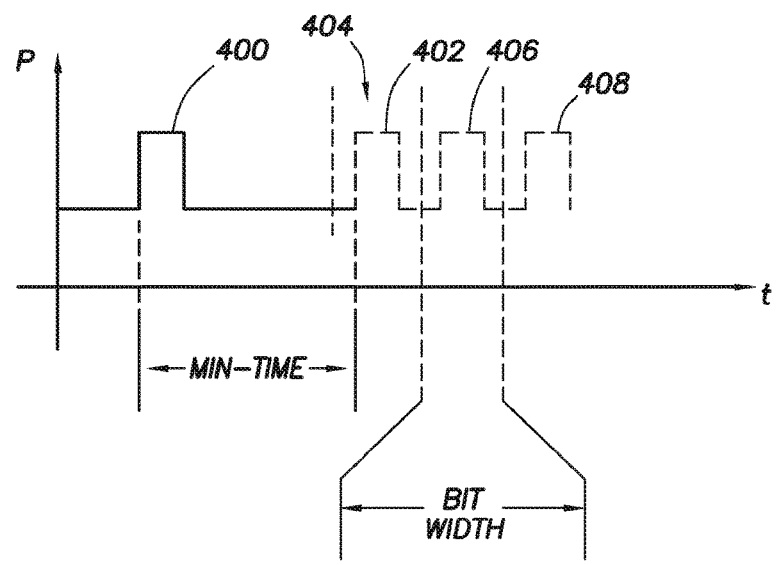
FIG. 4 shows drilling fluid pressure as a function of time, and showing a single interval (defined by coherent features of consecutive pressure pulses) with several possible second pulses.

FIG. 4 shows a single interval comprising a first pulse 400 and several possible second pulses (shown in dashed lines) to further illustrate parameters. In particular, the pulse position modulation aspect of particular embodiments utilizes a window in Which a pulse of an interval may fall, yet still represent the same value. After the MIN-TIME, a pulse may fall within one of several BIT-WIDTH windows. So long as pulse falls somewhere within the BIT-WIDTH window, the data value encoded is still the same. For example, the pulse 402 falls within a first BIT-WIDTH window 404, and thus in this particular example the interval encodes a data value zero (e.g., hexadecimal 00). Pulse 406 falls within the next BIT-WIDTH window, and therefore the time duration between pulse 400 and pulse 406 represents a first data value (e.g., hexadecimal 01). Likewise, the pulse 408 falls within the third BIT-WIDTH window, and therefore the time duration between pulse 400 and pulse 408 may represent a second data value (e.g., hexadecimal 10). The data value may be decoded using substantially the following equation:

$$\text{DATA} = (\text{INTERVAL} - \text{MIN-TIME})/\text{BIT-WIDTH} \qquad (1)$$

Where DATA is the decoded value, INTERVAL is the measured time between coherent features of the two pulses, and MIN-TIME and BIT-WIDTH are as described above. The BIT-WIDTH may change for each particular drilling situation, but in most cases ranges from between approximately 20 ms to 120 ms, and in many cases a BIT-WIDTH of 40 ms is used. For a particular number of bits encoded within each interval, there is a maximum time (MAX-TIME) duration. For example, if a particular interval encodes a four-bit number (which could therefore range from zero to fifteen), the four-bit number at its maximum value forces an interval duration equal to MAX-TIME.

Figure 5A:
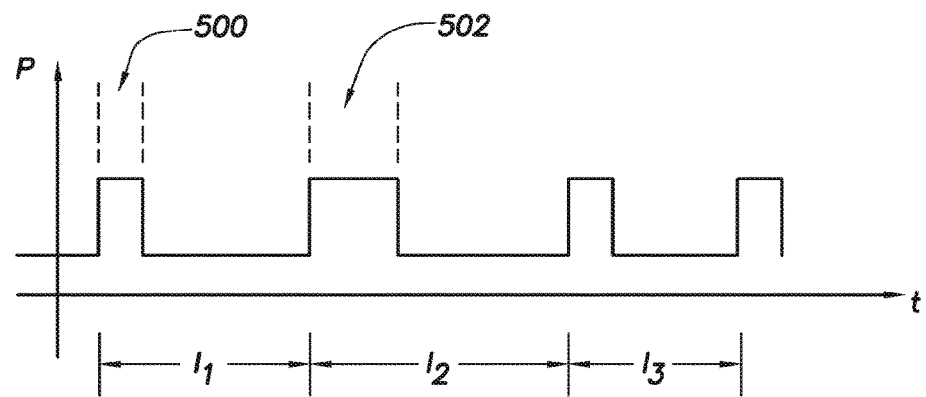
FIG. 5A shows drilling fluid pressure as a function of time, and showing encoding data for each interval as the time between pressure transitions of one of the pulses that make up the interval.

In accordance with at least some embodiments, in addition to the value encoded as the amount of time between coherent features of consecutive pulses that make up an interval, an additional value is encoded in the duration of at least one of the pulses that make up the interval. FIG. 5A shows a plurality of intervals $I_1$, $I_2$ and $I_3$, with varying pulse durations, to illustrate the combined coding. In particular, FIG. 5A illustrates two possible pulse durations, with pulse 500 illustrating a short duration, and pulse 502 illustrating a long duration. A short pulse time duration may encode a first data value (e.g., data value zero), and a long pulse time duration may encode a second data value (e.g., data value 1). Thus, the total number of bits encoded in an interval includes the number of bits from the pulse position modulation, as well as the additional bit or bits encoded in the duration of one of the pulses. For example, if each interval encodes a four-bit number in the amount of time between coherent features of consecutive pulses, and an additional bit is encoded in the pulse duration of one of the pulses, then a total of five bits is encoded. More generally then, in some embodiments a number of bits encoded in the time between coherent features is in the range of 3 to 6 bits, and a number of bits encoded in the pulse duration is in range of 1 to 3 bits.

Figure 5B:
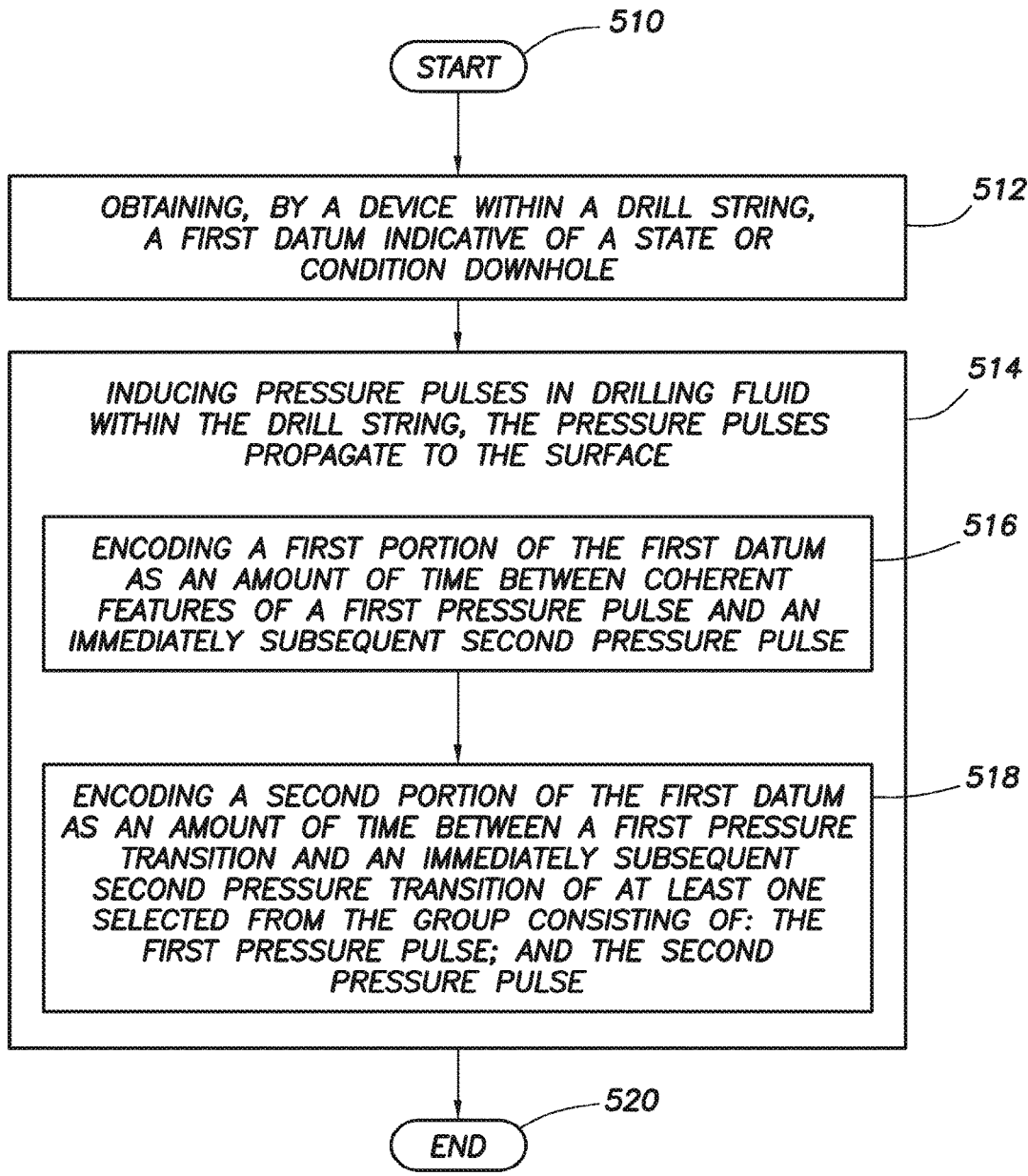
FIG. 5B shows a method in accordance with at least some embodiments.

FIG. 5B shows a method in accordance with embodiments where data values are encoded as the amount of time between coherent features of consecutive pulses that make up an interval and in the duration of at least one of the pulses that make up the interval. In particular, the method starts (block 510) and proceeds to obtaining, by a device within a drill string, a first datum indicative of a state or condition downhole (block 512). For example, the first datum could be a formation parameter, a parameter of the drill string (e.g., orientation, direction), or a state or condition of the drill string itself). Regardless of the precise parameter, the illustrative method proceed to inducing pressure pulses in drilling fluid within the drill string, the pressure pulses propagate to the surface (block 514). The inducing comprises encoding a first portion of the first datum as an amount of time between coherent features of a first pressure pulse and an immediately subsequent second pressure pulse (block 516). And the inducting further comprises encoding a second portion of the first datum as an amount of time between a first pressure transition and an immediately subsequent second pressure transition of at least one selected from the group consisting of: the first pressure pulse; and the second pressure pulse (block 518). Thereafter, the illustrative method ends (block 520).

Figure 5C:
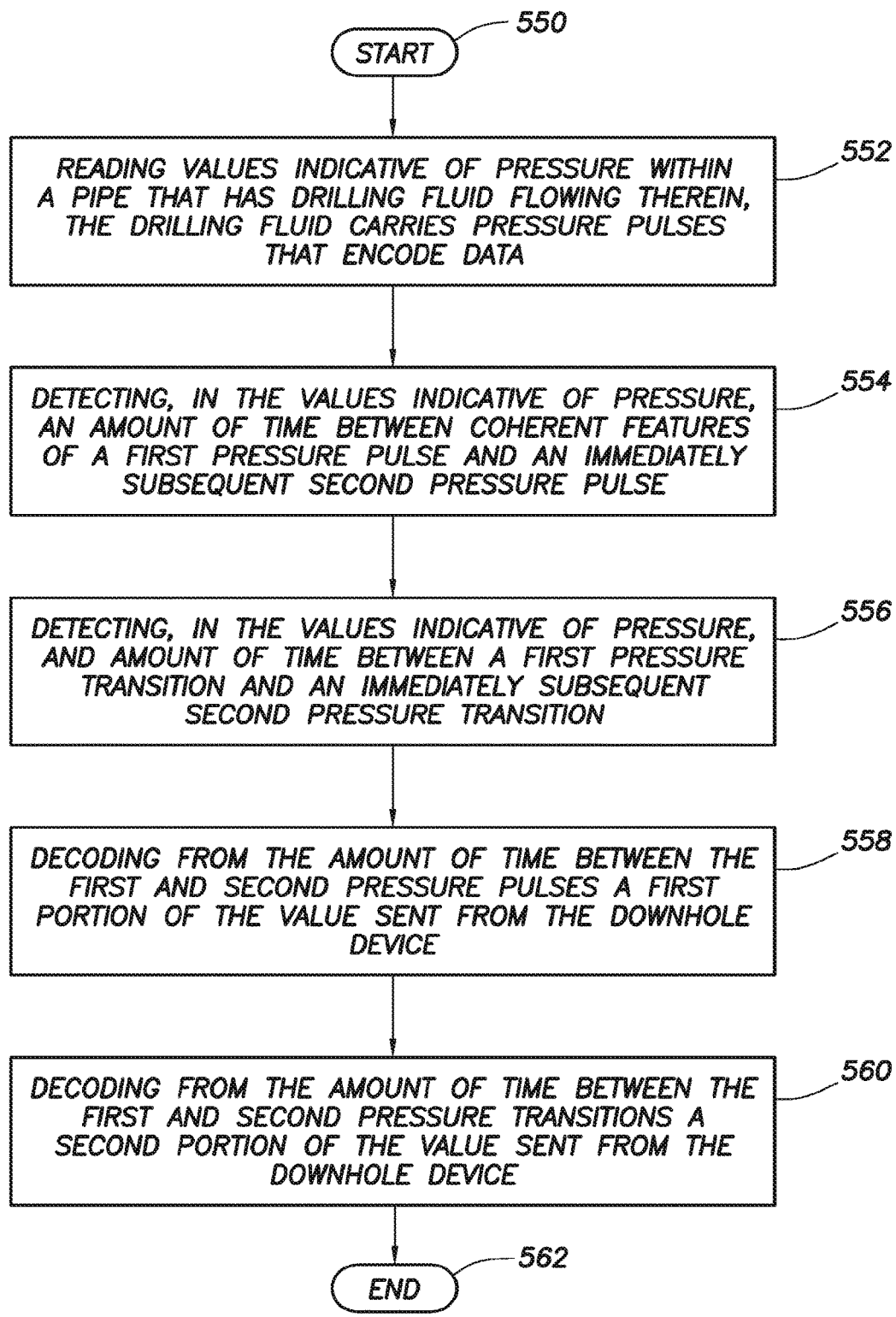
FIG. 5C shows a method in accordance with at least some embodiments.

FIG. 5C likewise illustrates a method (e.g., software) in accordance with embodiments where data values are encoded as the amount of time between coherent features of consecutive pulses that make up an interval and in the duration of at least one of the pulses that make up the interval. In particular, the method starts (block 550) and proceeds to read values indicative of pressure within a pipe that has drilling fluid flowing therein, the drilling fluid carries pressure pulses that encode data (block 552). Next, the method detects (in the values indicative of pressure) an amount of time between coherent features of a first pressure pulse and an immediately subsequent second pressure pulse (block 554), and detects (in the values indicative of pressure) an amount of time between a first pressure transition and an immediately subsequent second pressure transition (block 556). The method then decodes from the amount of time between the first and second pressure pulses a first portion of the value sent from the downhole device (block 558), and decodes from the amount of time between the first and second pressure transitions a second portion of the value sent from the downhole device (block 560). Thereafter, the method ends (block 562).

Before delving into the advantage of encoding bits in the manner illustrated in FIG. 5, a few points are in order. Though FIG. 5 illustrates that in some embodiments the leading pulse in each interval encodes the additional bit or bits, in other embodiments the trailing pulse encodes the additional bits for an interval. Moreover, so as not to unduly complicate the discussion, FIG. 5 illustrates only two distinct pulse durations; however, two or more distinct pulse durations may be equivalently used (e.g., four distinct pulse durations). In the illustrative case of four distinct pulse durations, two additional bits of data may be encoded. So, for example, if five bits of data are encoded in the amount of time between coherent features of two adjacent pulses, and two bits are encoded in one of the pulses, then a total of seven bits is encoded.

In some cases, where the amount of energy needed to modulate data as pressure pulses in the drilling fluid is unlimited, encoding additional data bits in the pulse duration is used to increase the total bandwidth of the system. However, as described in reference to FIG. 2, the pulse control module 202 of some telemetry modules 134 operate based solely on the energy stored in battery 230. The encoding technique described above may be used to extend battery life while transferring the same overall amount of data. In many cases a bit run (i.e., the amount of time pulse control module 202 is expected to run on battery power alone without being recharged) may last many days. By encoding additional data bits in the pulse duration, and slowing the overall pulse rate, the same amount of information may be telemetered to the surface with fewer pulses, thus extending the battery life.

FIG. 6 shows a graph that relates the number of bits per second modulated as pressure pulses of the drilling fluid, MIN-TIME for pulses, and battery life. The description of FIG. 6 will first consider a system where no pulses are encoded in the time between pressure transitions, followed by an example of encoding data in the time between pressure transitions.

Consider, as a first example of the relationship between bits per second and MIN-TIME, a system where the time between pressure pulses encodes four bits of data, the BIT WIDTH is 40 ms, and the pulse time durations are a constant 50 ms. Dashed line 600 relates the bits per second (left vertical scale) in the illustrative situation to the selected MIN-TIME (bottom scale). For example, for an illustrative MIN-TIME equal to 300 ms, six bits per second can be encoded (point 602). For an illustrative MEN-TIME equal to 1000 ms, about 3 bits per second can be encoded (point 604, but read from the left scale). Solid line 606 relates the battery life (right vertical scale) to the selected MIN-TIME. For example, for constant pulse time durations and an illustrative MIN-TIME of 400 ms (point 608), a battery life of about five days can be expected (as shown by lines 610 and 612).

Still referring to FIG. 6, now consider a situation where two bits are encoded as the time between pressure transitions, four bits are encoded in the time between pressure pulses, and the BIT WIDTH is 20 ms. Dash-dot-dash line 616 relates the bits per second (left vertical scale) in the illustrative situation to the selected MIN-TIME. For example, for an illustrative MIN-TIME equal to 300 ms, 12 bits per second can be encoded (point 618). For an illustrative MIN-TIME equal to 1000 ms, about 5 bits per second can be encoded (point 620, but read from the left scale). So as between the system with constant pulse time durations and encoding two bits in as the time between pressure transitions, encoding two bits in the pulse width and a MIN-TIME of 1000 ms produces about the same bit rate (approximately five bits per second) as systems with constant pulse time duration at a MIN-TIME of 400 ms (point 608), but the battery life may double.

Returning briefly to FIG. 2, in the combined coding embodiments the communication section 200 may pass to the pulse control section 202, for each interval, a set of timings that indicate the time between coherent features of consecutive pressure pulses, along with an indication of the pulse duration. Alternatively, the communication section, for each interval, may pass two timings—one for the time between coherent features of consecutive pressure pulses, and one for the time between pressure transitions of one of the pressure pulses. Further still, the communication section 200 may pass to the pulse control section 202 the datum to be modulated, and the pulse control section may then separate the datum into two groups of bits being those bits to be encoded as the time between coherent features of consecutive pulses, and those bits to be encoded in the time between consecution pressure transitions.

In accordance with yet still other embodiments, the downhole data may be encoded exclusively as the time between pressure transitions. More particularly, some embodiments encode data as the time between a first pressure transition of the drilling fluid, and an immediately subsequent pressure transition of the drilling fluid, whether those transitions are positive pressure transitions or negative pressure transitions.

Figure 7:
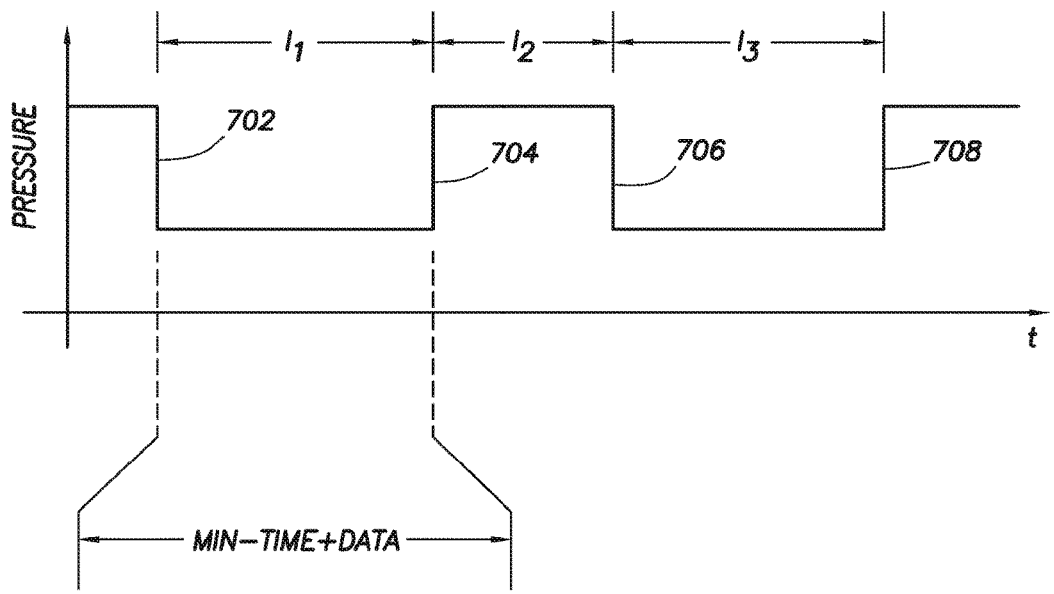
FIG. 7 shows a graph of drilling fluid pressure as a function of time, and showing encoding data solely as the time between pressure transitions.

FIG. 7 shows an exemplary graph of drilling fluid pressure as a function of time, which may be measured by the computer system 144 coupled to one of the transducers 136, 138 and/or 140 (FIG. 1). The illustrative graph of FIG. 7 represents an ideal situation where ideal transitions are generated downhole, and are detected as ideal transitions at the surface. The nature of the pulses that create the pressure transitions may be either positive pulses or negative pulses, but in some cases negative-pulse systems create more distinct pressure transitions. In accordance with the specific embodiment, data is transmitted in intervals, and FIG. 7 shows three such intervals $I_1$, $I_2$ and $I_3$. An interval in this embodiments is the amount of time between consecutive pressure transitions. For example, and as shown for interval $I_1$, an interval may be an amount of time between a negative pressure transition 702 and an immediately subsequent positive pressure transition 704. Likewise, and as shown for interval $I_2$, an interval may be an amount of time between a positive pressure transition 704 and an immediately subsequent negative pressure transition 706. Each interval has a duration that is at least a MIN-TIME. An interval having a time duration substantially equal to the MIN-TIME encodes a data value zero. The MIN-TIME may change for each particular drilling situation, but in most cases ranges from between approximately 0.3 seconds to 2.0 seconds, and in many cases a MIN-TIME is 0.6 seconds is used.

Figure 8:
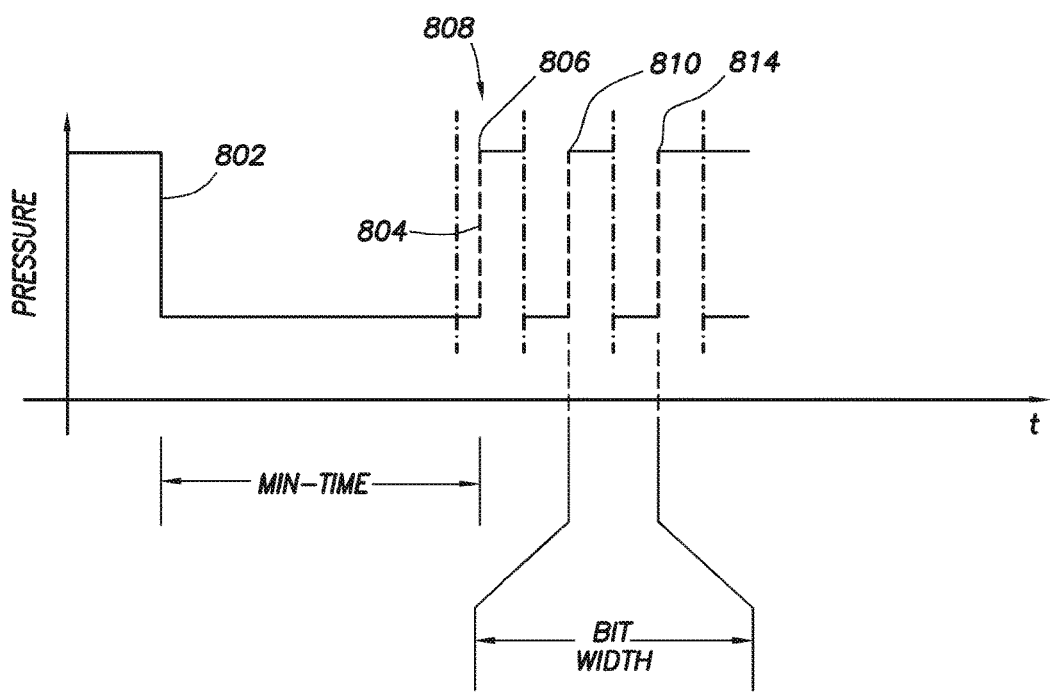
FIG. 8 shows drilling fluid pressure as a function of time, and showing a single interval (defined by consecutive pressure transitions) with several possible second transitions.

FIG. 8 shows a single interval comprising a first and several possible second pressure transitions (shown in dashed lines) to further illustrate various parameters. Illustrative FIG. 8 is shown with respect to an interval comprising a negative pressure transition 802 and a positive pressure transition 804, but the various parameters are equally applicable to intervals created from positive pressure transitions followed by negative pressure transitions. The particular embodiments utilize a window in which the second pressure transition of an interval may fall, yet still represent the same value. After the MIN-TIME, a pressure transition may fall within one of several BIT-WIDTH windows (shown by dash-dot-dash lines). So long as a transition falls somewhere within the BIT-WIDTH window, the data value encoded is still the same. For example, the transition 806 falls within a first BIT-WIDTH window 808, and thus in this particular example the interval encodes a data value zero (e.g., hexadecimal 00). Transition 810 falls within the next BIT-WIDTH window, and therefore the time duration between transition 802 and transition 810 represents a first data value (e.g., hexadecimal 01). Likewise, the transition 814 falls within the third BIT-WIDTH window, and therefore the time duration between transition 804 and transition 814 may represent a second data value (e.g., hexadecimal 10). The data value may be decoded using substantially the following equation:

$$DATA=(INTERVAL-MIN\text{-}TIME)/BIT\text{-}WIDTH \quad (2)$$

Where DATA is the decoded value, INTERVAL is the measured time between consecutive pressure transitions, and MIN-TIME and BIT-WIDTH are as described above. The BIT-WIDTH may change for each particular drilling situation, but in most cases ranges from between approximately 20 ms and 120 ms, and in many cases a BIT-WIDTH of 40 ms is used.

Encoding data solely within the time between pressure transitions significantly increases overall the bit rate for the system and/or may be used to increase battery life of the telemetry module 134 (FIG. 1). For example, consider a pulse position modulation system where each interval encodes seven bits of data. For long strings of pulses, each pulse serves double duty—the trailing pulse of one interval, and the leading pulse of the next interval. In order to calculate bits per pressure transition, the leading pressure transition of each pulse is considered to be shared (assigned a 0.5 transition value), the second pressure transition not shared, and the final pressure transition shared (also assigned a 0.5 transition value). The illustrative seven bits are thus encoded by two pressure transitions (two shared transitions, and an unshared transition), resulting in 3.5 bits per pressure transition (7 bits/2 transitions).

Now consider a system where each interval encodes seven bits of data as the time between pressure transitions. For long strings of pressure transitions, each pressure transition serves double duty—the trailing transition of one interval, and the leading transition of the next interval. In order to calculate bits per pressure transition, the leading pressure transition of each interval is considered to be shared (assigned a 0.5 transition value) and the trailing transition of each interval is considered to be shared (also assigned a 0.5 transition value). Thus, in systems where the data is encoded as the time between pressure transitions, for long strings of pressure transitions the illustrative seven bits are encoded effectively by one pressure transition (two shared transitions), resulting in seven bits per pressure transition (7 bits/1 transition). In drilling situations where the limiting factor is battery life of the pulse control section 202 (FIG. 2) of the telemetry module 134 (FIG. 1), an increase in data per pulse, combined with a decreased effective pressure transition rate (and thus decreased pulse rate), increases the amount of time the battery of the pulse control section 202 is operation downhole for the same amount of data telemetered to the surface.

Returning briefly to FIG. 2, in the embodiments where data is encoded exclusively as the time between consecutive pressure transitions, the communication section 200 may pass to the pulse control section 202, for each interval, an indication of the timing to be used between consecutive pressure transitions. Alternatively, the communication section 200 may pass to the pulse control section 202 the datum to be modulated, and the pulse control section may then determine the timings to be used.

The various embodiments discussed to this point have all been in relation to techniques for modulating the drilling fluid by the telemetry module 134 (FIG. 1). Returning briefly to FIG. 1, the pressures pulses and/or pressure transitions propagate from the downhole telemetry module 134 to the goose neck 124, riser pipe 120 and flow line 118. Any one or a combination of the transducers 136, 138 and/or 140 detect the pressure changes, and a time series of values representing pressure (i.e., a pressure waveform) in the pipe at the various locations is read by the computer system 144. The discussion now turns to various techniques and systems for detecting pressure pulses and/or pressure transitions read by the surface computer 144.

Figure 9:
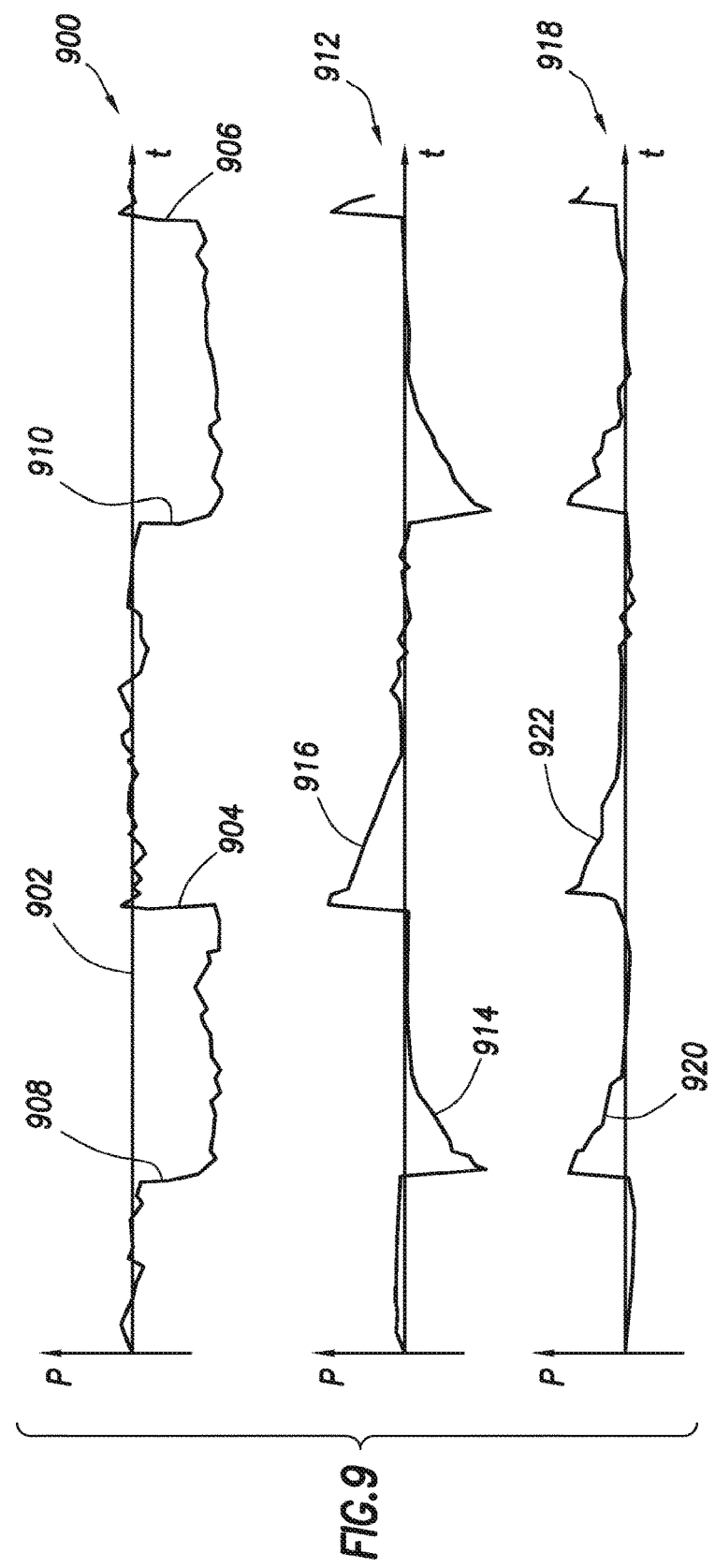
FIG. 9 shows a plurality of waveforms related to discussion of detection of pressure transitions in accordance with particular embodiments.

FIG. 9 shows a plurality of waveforms for discussion of an embodiment of detecting pressure transitions at the surface. In particular, FIG. 9 shows a pressure waveform 900 representing drilling fluid pressure read at the surface. The pressure waveform 900 is shown about a zero axis 902. In practice the pressure waveform oscillates around the baseline pressure of the drilling fluid created by the mud pump 116 (e.g., about 3000 pounds per square inch (psi)), but the drilling fluid baseline pressure is not shown so as not to unduly complicate the figure. The illustrative pressure waveform 900 has four pressure transitions, being two positive pressure transitions 904 and 906, as well as two negative pressure transitions 908 and 910. For relatively new drilling rigs, drilling rigs that are well designed, and/or drilling rigs with good drilling fluid pressure noise cancellation, pressure waveform 900 may be read by a single pressure transducer.

In other cases, the waveform 900 may be the result of combining the pressure waveforms from three or more pressure transducers.

In accordance with the particular embodiment, detecting the pressure transitions associated with pressure pulses involves calculating a filtered pressure representation of the pressure waveform 900, the filtered pressure representation shown as waveform 912. In at least some embodiments, the filtering performed is high-pass filtering, but other filtering techniques (e.g., instantaneous first derivative of the pressure waveform 900) may be equivalently used. The filtered pressure waveform thus shows the pressure transitions as positive-going and negative-going pressure spikes. For example, negative pressure transition 908 in the pressure waveform 900 results in a negative-going pressure spike 914 in the filtered pressure waveform 912. Likewise, positive pressure transition 904 in the pressure waveform 900 results in a positive-going pressure spike 916 in the filtered pressure waveform.

Next, the absolute value of the filtered pressure waveform 912 is taken, resulting in final waveform 918. Algorithmically taking the absolute value "flips" or "rotates" all the negative-going pressure spikes to positive-going pressure spikes. Thus, negative-going pressure spike 914 in filtered waveform 912 becomes positive-going spike 920 in final waveform 918. Likewise, positive-going pressure spike 916 relates to positive-going pressure spike 922 in the final waveform 918. The significance of the all positive-going pressure spikes in the final waveform 918 is that each pressure transition effectively become pressure spike or pressure pulse in the final waveform 918. Thus, existing pressure pulse detection algorithms can be used to identify the pulses. Stated otherwise, detecting pressure transitions in accordance with the particular embodiment described in reference to FIG. 9 advantageously may use related-art pressure pulse detection techniques once the final pressure waveform 918 is determined.

Figure 10:
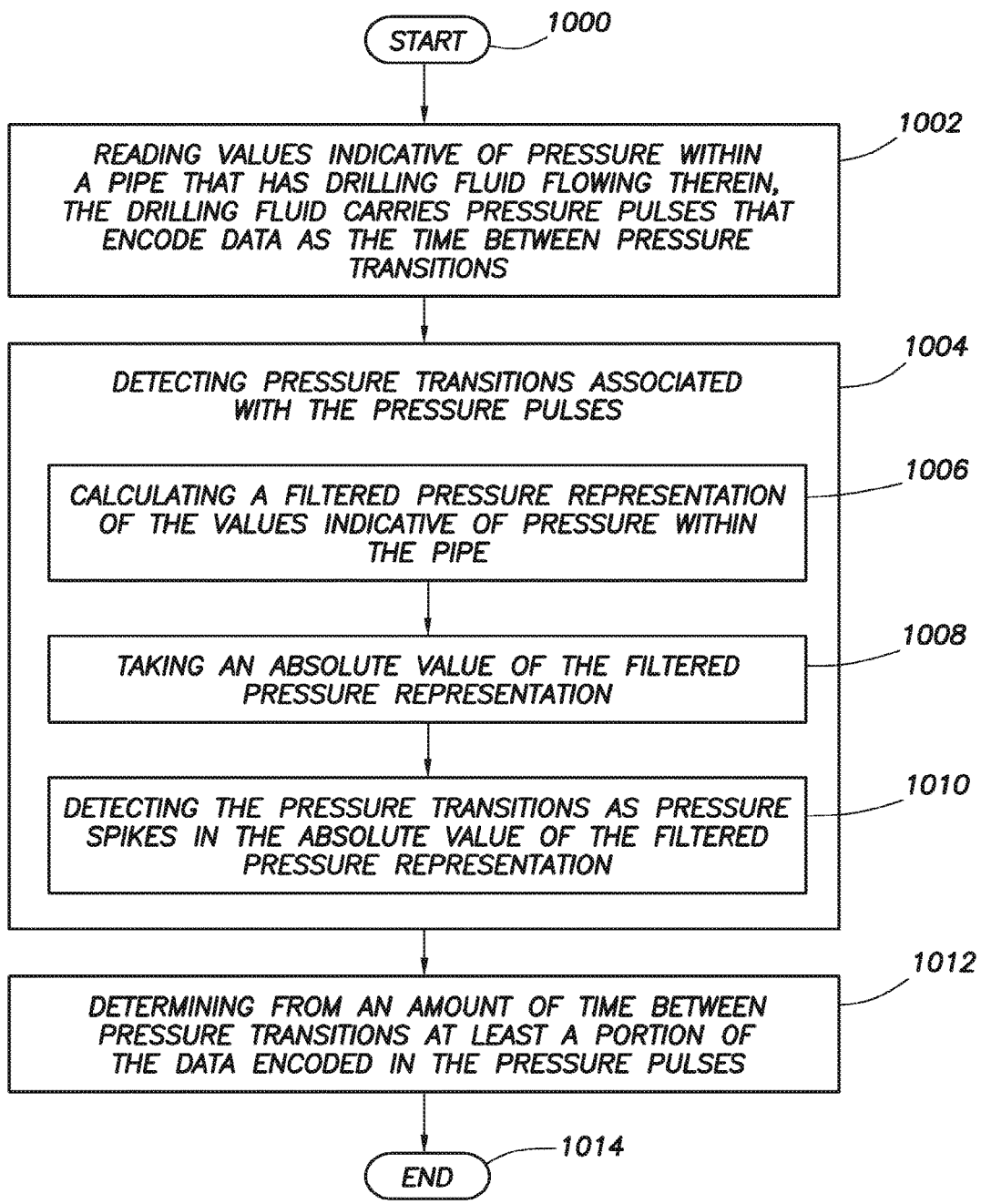
FIG. 10 shows a method in accordance with at least some embodiments.

FIG. 10 shows a method (e.g., an algorithm) used to detect pressure transitions in accordance with at least some embodiments, and related to the particular embodiment described in reference to FIG. 9. In particular, the illustrative method starts (1000) and proceeds to reading values indicative of pressure within a pipe that has drilling fluid flowing therein, the drilling fluid carries pressure pulses that encode data as the time between pressure transitions (block 1002). Next, the method involves detecting pressure transitions associated with the pressure pulses (block 1004). Detecting, in some embodiments, further involves calculating a filtered pressure representation of the values indicative of pressure within the pipe (block 1006). In some cases, calculating the filtered pressure representation is high-pass filtering the pressure waveform; however, any filtering methodology that produces a discernable feature may be equivalently used. Next, the illustrative method involves taking an absolute value of the filtered pressure representation (block 1008), and then detecting the pressure transitions as pressure spikes in the absolute value of the filtered pressure representation (block 1010). Based on the detected pressure spikes, the method proceeds to determining from an amount of time between pressure transitions at least a portion of the data encoded in the pressure pulses (block 1012), and the method ends (block 1014).

Figure 11:
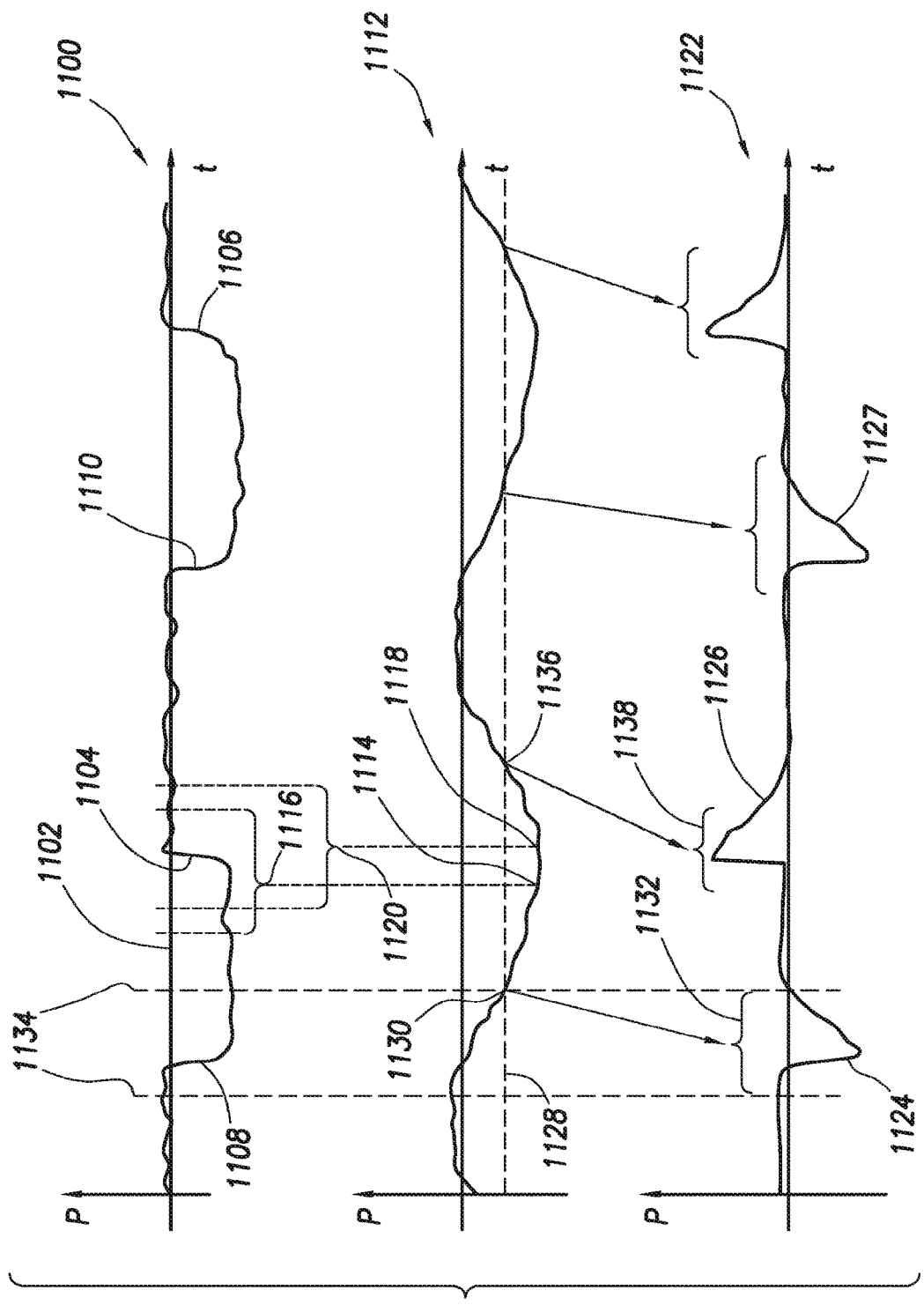
FIG. 11 shows a plurality of waveforms related to discussion of detection of pressure transitions in accordance with particular embodiments.

FIG. 11 shows a plurality of waveforms for discussion of another embodiment of detecting pressure transitions at the surface. In particular, FIG. 11 shows a pressure waveform 1100 representing drilling fluid pressure read at the surface (with the baseline pressure removed). The illustrative pressure waveform 1100 has four pressure transitions, being two positive pressure transitions 1104 and 1106, as well as two negative pressure transitions 1108 and 1110. For relatively new drilling rigs, drilling rigs that are well designed, and/or drilling rigs with good drilling fluid pressure noise cancellation, pressure waveform 1100 may be read by a single pressure transducer. In other cases, the waveform 1100 may be the result of combining the pressure waveforms from three or more pressure transducers.

In accordance with the particular embodiment, detecting the pressure transitions associated with pressure pulses involves calculating a running average pressure representation, the running average representation shown in waveform 1112. Each datum in the running average pressure representation 1112 is the running average of the pressure waveform 1100 over a predetermined window of values, and the window moves in time. The time width of the predetermined window is proportional to the bit rate, and in particular embodiments the predetermined window is substantially the same as the MIN-TIME used in modulating the data onto the drilling fluid by the telemetry module 134. For example, the datum 1114 in the running average pressure representation 1112 may be the average of the values in a window 1116 of the pressure waveform 1100. Likewise, datum 1118 may be the average of the values in window 1120 of the pressure waveform 1100.

Still referring to FIG. 11, and in accordance with the particular embodiment, detecting the pressure transitions associated with the pressure pulses further involves calculating a filtered pressure representation of the pressure waveform 1100, the filtered pressure representation shown in waveform 1122. In at least some embodiments, the filtering performed is high-pass filtering, but other filtering techniques (e.g., instantaneous first derivative of the pressure waveform 1100) may be equivalently used. The filtered pressure waveform 1122 thus shows the pressure transitions as positive-going and negative-going pressure spikes. For example, negative pressure transitions 1108 in the pressure waveform 1100 results in a negative-going pressure spike 1124 in the filtered pressure waveform 1122. Likewise, positive pressure transition 1104 in the pressure waveform 1100 results in a positive-going pressure spike 1126 in the filtered pressure waveform 1122.

Detecting the pressure transitions in accordance with the embodiments illustrated by FIG. 11 involves a relationship between the running average pressure representation 1112 and the filtered pressure representation 1122. In particular, the running average pressure representation 1112 is monitored. When the running average pressure representation 1112 substantially equals a predetermined value (e.g., the value as shown by dashed line 1128) and the slope of the running average pressure representation 1112 is negative, the filtered pressure waveform 1122 is searched for negative-going pressure transitions. Likewise, when the running average pressure representation 1112 substantially equals a predetermined value and the slope of the running average pressure representation 1112 is positive, the filtered pressure waveform 1122 is searched for positive-going pressure transitions. It is noted that while the predetermined value may be the same in some embodiments (and as illustrated by line 1128), the predetermined values need not be the same for the positive going and negative going indications.

Consider, as an example, datum 1130 in the running average pressure representation 1112. Illustrative datum 1130 is the point where the running average substantially equals the predetermined value. Moreover, the slope of the running average pressure representation 1112 proximate to datum 1130 is negative (stated otherwise, the first derivative is negative). Based on the datum being substantially equal to the predetermined value and the slope being negative, the filtered pressure waveform 1122 is searched in a window of values for a negative pressure transition. The running average pressure representation 1112 reaches the predetermined value after the negative pressure transition occurs. Thus, the window of values within which the filtered pressure waveform 1122 is searched corresponds, at least in part, to the window of values used to calculate the datum that substantially equaled the predetermined value. The window within which the filtered pressure waveform 1122 is searched is illustrated by window 1132, and the correspondence between window 1132 and the pressure waveform 1100 is showed by dashed lines 1134.

Now consider, as an example, datum 1136 in the running average pressure representation 1112. Illustrative datum 1136 is the point where the running average again substantially equals the predetermined value. Moreover, the slope of the running average pressure representation 1112 at proximate to datum 1136 is positive (stated otherwise, the first derivative is positive). Based on the datum being substantially equal to the predetermined value and the slope being positive, the filtered pressure waveform 1122 is searched in a window 1138 of values for a positive pressure transition.

Making a determination as to whether a datum substantially equals the predetermined value may take many forms. In some embodiments, the predetermined value may be a small range or window of values, such that determining whether the datum substantially equals the predetermined value involves a comparison of the value of the datum to the window of values. In other embodiments, the predetermined value is a single value and determining whether the datum substantially equals the predetermined value involves determining a percentage error between the datum and the predetermined value. For example, if the percentage error between a datum and the predetermined value is equal to or less than a predetermined error (e.g., 0.1%), then the datum may be considered equal to the predetermined value.

In other embodiments, the method involves looking forward in time rather than back in time. In particular, in other embodiments when the running average pressure representation 1112 reaches a predetermined value and is negative, the method involves searching forward in time for a positive pressure transitions. For example, datum 1130 meets the predetermined value and the running average pressure representation 1112 is negative, the method searches forward in time for positive pressure transition 1126. Likewise in the alternative embodiment, datum 1136 meets the predetermined value and the running average pressure representation 1112 is positive, the method searches forward in time for negative pressure transition 1127.

Figure 12:
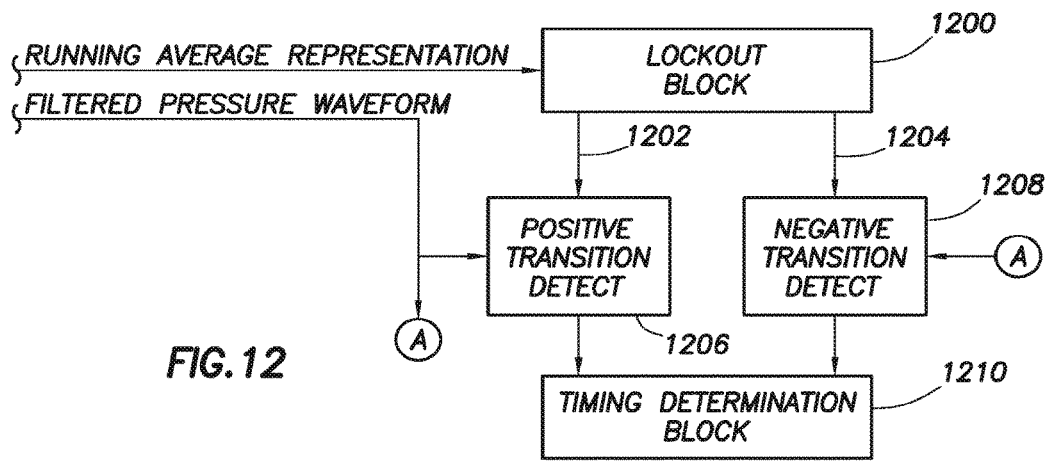
FIG. 12 shows a block diagram of interaction of software modules in accordance with at least some embodiments.

FIG. 12 shows a block diagram that illustrates a logical relationship between various pieces of software to implement the detection system discussed in relation to FIG. 11, and in accordance with at least some embodiments. In particular, the running average pressure representation 1117 is supplied to a lockout module 1200. In accordance with the particular embodiment, the lockout module 1200 makes the determination as to whether the running average pressure representation 1112 meets the predetermined value, and calculates the slope of the running average pressure representation 1112 within the window. The lockout module 1200 produces a pair of lockout signals 1202 and 1204. During periods of time within which negative pressure transitions should be searched for in the filtered pressure waveform 1122 (e.g., the running average pressure representation 1112 substantially equals the predetermined value and the slope is negative), the lockout module 1200 asserts lockout signal 1202 and de-asserts lockout signal 1204. Likewise, during periods of time within which positive pressure transitions should be searched for (e.g., the running average pressure representation 1112 substantially equals the predetermined value and the slope is positive), the lockout module 1200 asserts lockout signal 1204 and de-asserts lockout signal 1202.

The illustrative software further comprises a positive transition detection module 1206 and a negative transition detection module 1208. Both the positive transition detection module 1206 and the negative transition detection module 1208 are provided the filtered pressure waveform 1122. In accordance with at least some embodiments, each detection module is configured to search the filtered pressure waveform 1122 for respective types of transitions. However, during periods of time when the respective lockout signals 1202 and 1204 are asserted, transitions detected are ignored. For example, positive transition detection module 1206 searches the filtered pressure waveform 1122 for positive pressure transitions. When a positive pressure transition is detected, and the lockout 1202 from the lockout block is de-asserted, the positive transition module 1206 provides an indication to the timing determination block 1210. If a positive pressure transition is detected, but the lockout 1202 from the lockout block is asserted, the positive transition module 1206 refrains from providing an indication to the timing determination block 1210. Likewise, negative transition detection module 1208 searches the filtered pressure waveform 1122 for negative pressure transitions. When a negative pressure transition is detected, and the lockout 1204 from the lockout block is de-asserted, the negative transition module 1208 provides an indication to the timing determination block 1210. If a negative pressure transition is detected, but the lockout 1204 from the lockout block is asserted, the negative transition module 1208 refrains from providing an indication to the timing determination block 1210. In other embodiments, the transitions detection modules 1206 and 1208 are disabled during periods of time when their respective lockout signals 1202 and 1204 are asserted.

The timing determination block 1210 receives the indications from the positive transition detection module 1206 and negative transition detection module 1208, and determines the time between respective transitions. In some embodiments, the transition detection modules 1206 and 1208 send a value to the timing determination block 1210 indicating the time at which a respective positive or negative transition was determined. In yet still other embodiments, the transition detection modules 1206 and 1208 send Boolean values, and the timing determination block 1210 determines the time between transitions based on a difference in arrival time of the Boolean values from each transition detection module. Based on the time between consecutive transitions, the data values encoded by such transitions may be demodulated according to the equations above.

Figure 13:
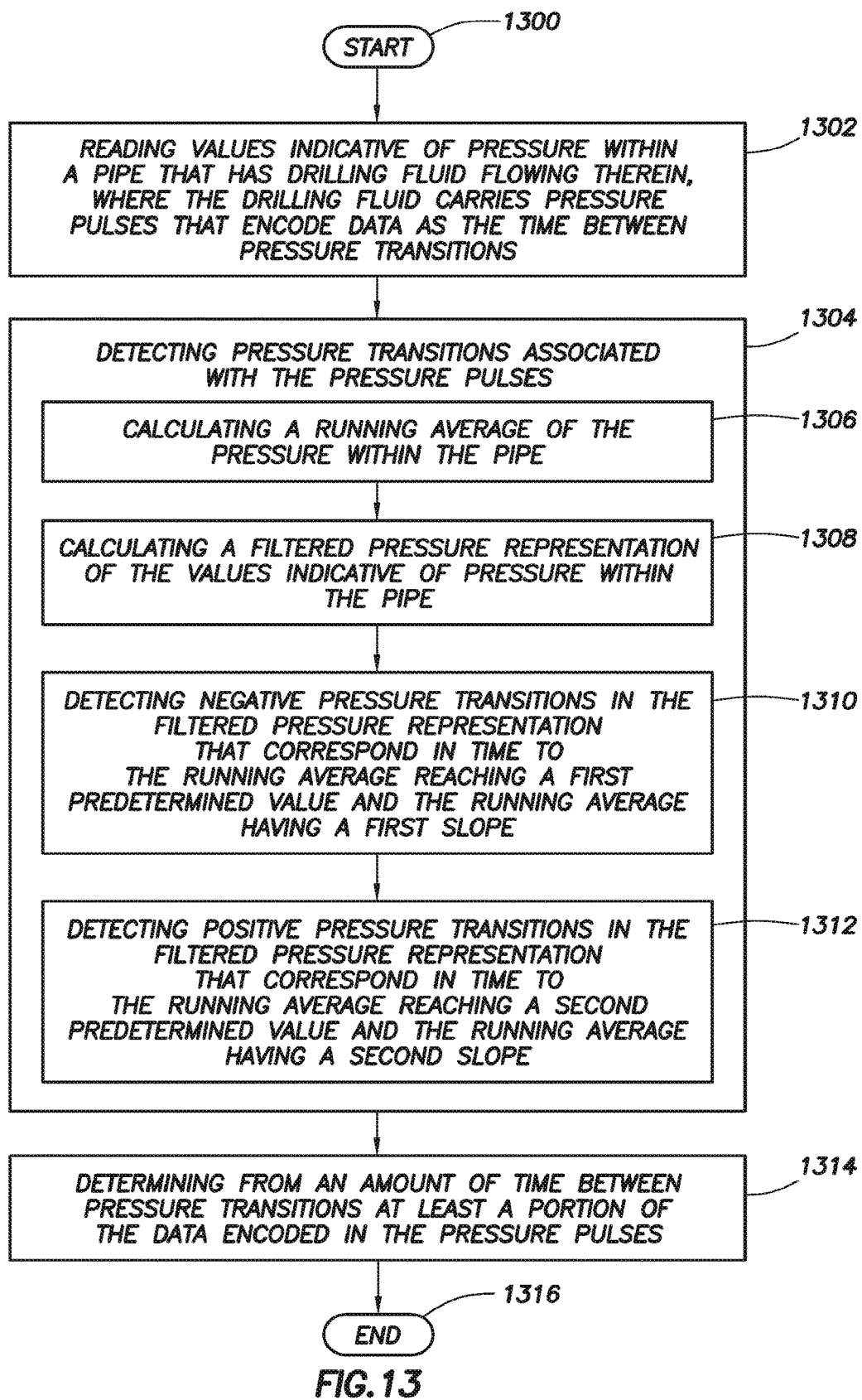
FIG. 13 shows a method in accordance with at least some embodiments.

FIG. 13 shows a method (e.g., an algorithm) used to detect pressure transitions in accordance with at least some embodiments, and related to the particular embodiment described in reference to FIGS. 11 and 12. In particular, illustrative method starts (block 1300) and proceeds to reading values indicative of pressure within a pipe that has drilling fluid flowing therein (where the drilling fluid carries pressure pulses that encode data as the time between pressure transitions) (block 1302). Next, the illustrative method involves detecting pressure transitions associated with the pressure pulses (block 1304). Detecting, in some embodiments, further comprises calculating a running average of the pressure within the pipe (block 1306). In some embodiments, the window of values used to calculate each datum of the running average is approximately the time of the MIN-TIME used to encode data, but other window time durations may be equivalently used. Next, the illustrative method involves calculating a filtered pressure representation of the values indicative of pressure within the pipe (block 1308). In some cases, calculating the filtered pressure representation is high-pass filtering the pressure waveform; however, any filtering methodology that produces a discernable feature may be equivalently used. Next, the illustrative method involves detecting negative pressure transitions in the filtered pressure representation that correspond in time to the running average reaching a first predetermined value and the running average having a first slope (block 1310), and detecting positive pressure transitions in the filtered pressure representation that correspond in time to the running average reaching a second predetermined value and the running average having a second slope (block 1312). Based on the detected pressure transitions, the method proceeds to determining from an amount of time between pressure transitions at least a portion of the data encoded in the pressure pulses (block 1314), and the method ends (block 1316).

The various embodiments discussed to this point have assumed a relatively noise-free pressure signal detected at the surface, or pre-processing of the signal, to arrive at the pressure waveforms 900 (FIG. 9) and 1100 (FIG. 11). The specification now turns to characteristics of pressure pulses travelling in a drill string, as well as physical characteristics of drilling rigs, that adversely affect detectability of pressure pulses, as well as several alternative methods to deal with such adverse effects.

Pressure pulses created by the telemetry module 134 downhole travel upstream with a definite speed. Depending on the fluid properties of the drilling fluid, the speed of the pulse can range from about 3,200 feet per second to about 4,800 feet per second. Noise created when upstream traveling pressure pulses reflect to become downstream traveling pulses constructively or destructively interacts with the upstream traveling pulses.

Figure 14:
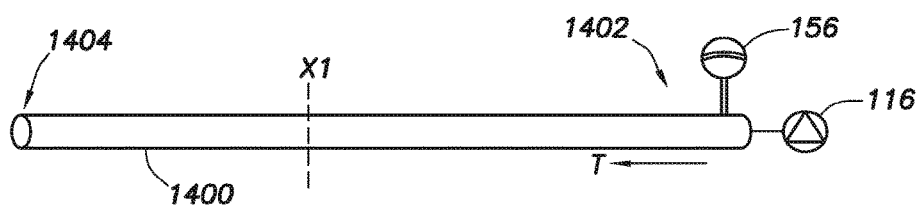
FIG. 14 shows an illustrative pipe with drilling fluid therein, and reflective devices, in order to describe reflection of pressure pulses and interference.
Figure 15:
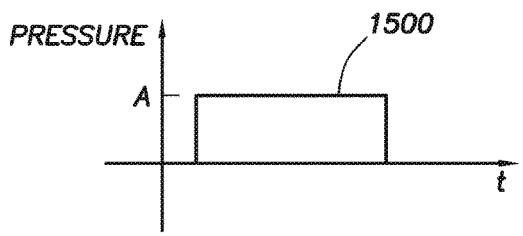
FIG. 15 shows a graph of drilling fluid pressure as a function of time for an upstream travelling pressure pulse.

For purposes of describing the interaction between upstream traveling pressure pulses and downstream traveling pressure pulses, reference is made to FIG. 14. FIG. 14 shows a long pipe 1400 having an upstream portion 1402, downstream portion 1404 and containing drilling fluid moving in the direction indicated by T. The pipe 1400 may be, for example, the flow line 118 (FIG. 1), the stand pipe 120 (FIG. 1), or some combination thereof, and thus the upstream portion 1402 may comprise desurger 156 and mud pump 116 (shown in symbolic form). Further consider that a pressure transducer (e.g., transducer 136, 138 or 140) is located at the position X1 indicated with the dash line. A pressure pulse created in the downsteam 1404 portion of the pipe 1400 travels from the downstream portion 1404 to the upstream portion 1402. The transducer at location X1 detects the pressure pulse as the pulse traverses the location of the transducer. FIG. 15 shows a graph as a function of time the pressure read by a transducer at location X1 as an upstream traveling pulse passes location X1, assuming the pressure pulse created is a perfect square wave with amplitude A, assuming no interaction with downstream traveling pressure pulses (discussed below). In some embodiments, the amplitude A may be on the order of a 10-50 PSI, but other larger and smaller amplitudes may be equivalently used. So as not to unduly complicate the description, the baseline pressure is not shown.

Figure 16:
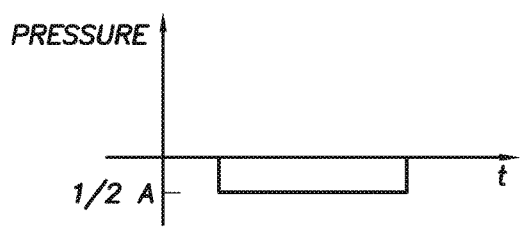
FIG. 16 shows a graph of drilling fluid pressure as a function of time for a reflected pressure pulse.

Upstream traveling pressure pulses, such as pressure pulse 1500, reflect from reflective devices (e.g., the desurger 156, mud pump 116) to create downstream traveling pressure pulses. In the case of reflection, a downstream traveling pressure pulse caused by reflection usually has an amplitude sign opposite that of the upstream traveling pulse, and the amplitude of a downstream traveling reflected pressure pulse may be about half pulse amplitude of the upstream traveling pulse, but other reflected pulse amplitudes and signs are possible. Thus, for an upstream traveling pulse of positive amplitude A, the reflection caused by the reflective devices illustratively creates a downstream traveling pulse of amplitude −A/2. FIG. 16 shows graph as a function of time of pressure pulse 1600 created by reflection of pressure pulse 1500 from the reflective devices, the pressure pulse 1600 as read by a transducer at location X1 as the downstream traveling pressure pulse passes the transducer at location X1, assuming a perfect square wave reflection, and assuming no interaction between the upstream and downstream traveling pressure pulses.

The amount of interaction, if any, between an upstream traveling pressure pulse and a downstream traveling pressure pulse is dependent upon the distance of the transmitter from the reflective devices, the pulse time duration and the speed of sound in the drilling fluid. In many cases, the speed of sound for drilling fluid is about 4,000 feet/s. If the telemetry module 134 (FIG. 1) produces a pressure pulse with a pulse time duration of 100 ms, the pulse length (i.e., the distance between the leading and trailing pressure transitions that make up the pulse) is about 400 feet (4000 feet/s×0.1 s). If the telemetry module 134 produces a pressure pulse with a pulse time duration of 200 ms, the pulse length is about 800 feet (4000 feet/s×0.2 s).

Figure 17:
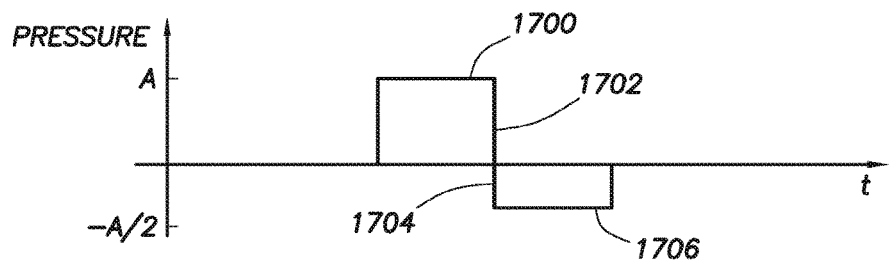
FIG. 17 shows a graph of drilling fluid pressure as a function of time for a particular placement of the transducer and pulse time duration.

For purposes of explanation, consider that location X1 is 200 feet from the desurger 156 and/or mud pump 116. Further consider that a pressure pulse having a pulse time duration of 100 ms is created by the telemetry module 134, and thus the upstream traveling pulse is about 400 feet in length. For these illustrative parameters, the pressure waveform read by a transducer at location X1 will be as shown in FIG. 17 (again, with the drilling fluid baseline pressure not shown, and assuming ideal square waves). In particular, the transducer initially sees the upstream traveling pressure pulse 1700. However, because the distance from the transducer to the reflective devices and back is 400 feet (200×2), and because the pressure pulse in this example has a pulse length of 400 feet, the trailing pressure transition 1702 of the upstream traveling pressure pulse passes the transducers just as the leading pressure transition 1704 of the reflected pulse 1706 reaches the transducer.

Figure 18:
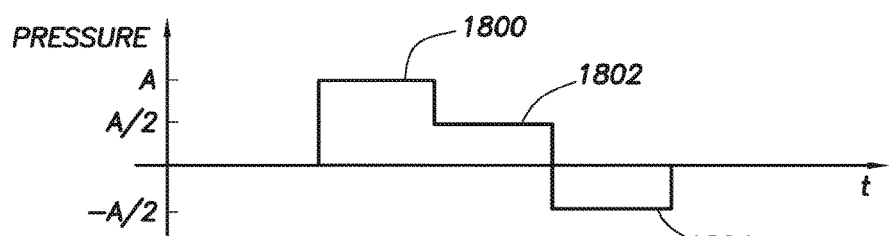
FIG. 18 shows a graph of drilling fluid pressure as a function of time for a particular placement of the transducer and pulse time duration.

Now consider, for the same transducer location (200 feet from the reflective devices), that the telemetry module 134 produces a pressure pulse having a pulse time duration of 200 ms, and thus a pulse length of 800 feet. For these illustrative parameters, the pressure waveform read by a transducer at location X1 will be as shown in FIG. 18. In particular, the transducer initially sees the upstream traveling pressure pulse, as illustrated by portion 1800. However, because the distance from the transducer to the reflective devices and back is 400 feet (200×2), and because the pressure pulse in this example has a pulse length of 800 feet, the leading edge of the reflected pulses reaches the transducer before the upstream traveling pressure pulses passes. The reflected pressure pulse interferes with the upstream travelling pressure pulse, thus creating portion 1802. Next, the trailing transition of the upstream traveling pressure pulses passes the transducer, thus the transducer only reads the reflected pressure pulse, as illustrated by portion 1804.

Figure 19:
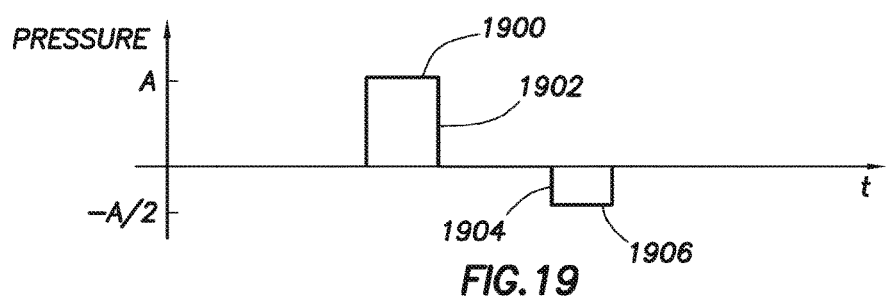
FIG. 19 shows a graph of drilling fluid pressure as a function of time for a particular placement of the transducer and pulse time duration.

Now consider, for the same transducer location (200 feet from the reflective devices), that the telemetry transmitter 134 produces a pressure pulse having a pulse time duration of 50 ms, and thus a pulse length of 200 feet. For these illustrative parameters, the pressure waveform read by a transducer at location X1 will be as shown in FIG. 19. In particular, the transducer initially sees the upstream traveling pressure pulse, as illustrated by portion 1900. However, because the distance from the transducer to the reflective devices and back is 400 feet (200×2), and because the pressure pulse in this example has a pulse length of 200 feet, the trailing pressure transition 1902 passes the transducer before the leading pressure transition 1904 of the reflected pressure pulse reaches the transducer. Finally, the reflected pressure pulse 1906 is read by the pressure transducer.

FIGS. 17-19 represent possible detected waveforms for particular transducers locations and particular pulse lengths. However, with time scaling, the set of possible waveforms of FIGS. 17-19 are illustrative of detected waveforms for all possible pulse lengths and all possible transducer locations. Stated otherwise, except for expansion and/or contraction in size along the time axis, and perhaps amplitude scaling as a function of distance from the reflective devices, the three waveforms are representative of the waveforms that can be expected for any pulse length and/or transducer location.

From the standpoint of detecting pressure pulses at the surface, an issue with respect to the waveforms of FIGS. 17-19 is their similarity. In particular, when considered that each waveform "rides" the baseline pressure of the drilling fluid, it may be difficult for software executing in the surface computer 144 to distinguish between, for example, the waveform of FIG. 18 (with upstream and reflected pressure pulse overlap at the transducer location) and the waveform of FIG. 19 (upstream and reflected waveforms pass the transducer at different times). Detecting the pressure pulses, and more particularly the pressure transitions associated with the pressure pulses, thus may be difficult. In order to address such difficulties, the present specification presents multiple embodiments for detecting the pressure pulses and/or pressure transitions, and the first of such embodiments relies on the placement of the transducers that create the waveform of FIG. 17.

In particular, for each pressure pulse time duration there is an associated pulse length (based on the speed of sound in the drilling fluid). And for each expected pulse length there is a physical placement of a transducer where the distance between the transducer and the reflective device is half the pulse length. Thus, when the telemetry module 134 produces a pressure pulse of a particular pulse length, the waveform read by a transducer located half the pulse length from the reflective devices produces a waveform similar to FIG. 17. The transducer placement that results in the waveform of FIG. 17 is referred to as the optimum location. Transducers closer to the reflective device, for same pressure pulse length, read a waveform similar to FIG. 18, and transducers farther from the reflective devices read a waveform similar to FIG. 19. At least some embodiments for detecting pressure pulses place a transducer at each optimum location for the predefined set of possible pulse time durations (and therefore pulse lengths) that may be modulated onto the drilling fluid by the telemetry module 134. Other, related, embodiments choose pulses for the predefined set of possible pulse time durations (and therefore pulse lengths) that correspond to the physical locations at which transducers are actually placed.

Consider, as an example, a system where a first number of bits of a datum to be telemetered to the surface is encoded as the time between coherent features of consecutive pressure pulses, and a one bit of the datum is encoded as the time between pressure transitions of one of the pulses (embodiments of FIG. 5). The illustrative system will have a predefined set of two possible pulse time durations—one pulse time duration representing a data value zero, and a second pulse time duration representing a data value one. Further consider that, with respect to the single bit encoded in the pressure transitions, a data value zero is encoded as pressure transitions of 50 ms apart (i.e., a pressure pulse 50 ms long) and a data value one is encoded as pressure transitions of 100 ms apart. For drilling fluid have a speed of sound of about 4,000 feet/s, the predefined set of pulse time durations {50 ms, 100 ms} results in two possible pulse lengths of 200 feet and 400 feet, respectively.

In accordance with these embodiments, a first transducer (e.g., transducer 138 (FIG. 1)) is located 100 feet from the desurger 156 and/or mud pump 116, and a second pressure transducer (e.g., transducer 136 (FIG. 1)) is located 200 feet from the desurger 156 and/or mud pump 116. It follows that regardless of whether the telemetry module 134 modulates a 50 ms pressure pulse (200 feet long) or a 100 ms pressure pulse (400 feet long), there is a pressure transducer located at the optimum location of each possible pressure pulse time duration. In some cases, the predetermined set pulse time durations may be communicated to the downhole device by way of a downlink communication using the drilling fluid as the propagation medium.

Figure 20:
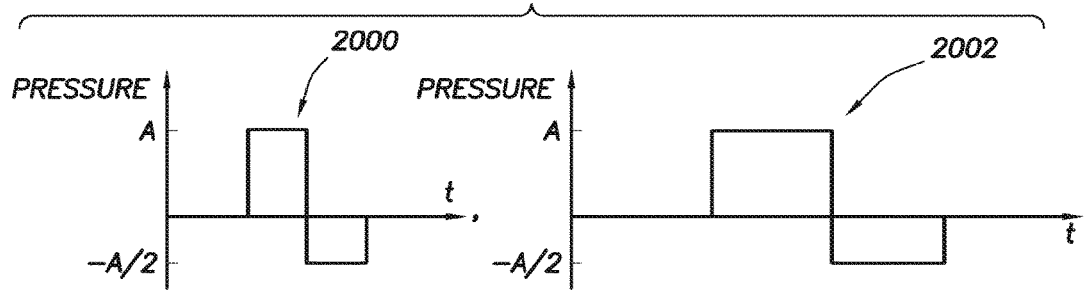
FIG. 20 represents a set of test pressure signals that correspond to a set of two possible pulse durations, in accordance with at least some embodiments.

In accordance with the particular embodiments that use a transducer at each optimum location for a given predefined set of pulse durations, determining the pulse time duration modulated by the telemetry module 134 involves, for each pressure signal read at the surface, correlating (in some cases mathematically, or graphically convolving) the pressure signal to a test pressure signal that represents the expected waveform of the pressure signal read if the pulse time duration corresponds to the location of the transducer. The pressure signal that has the highest correlation to its respective test pressure signal thus indicates the pulse time duration modulated downhole. For the illustrative predefined set of possible pulse time durations {50 ms, 100 ms}, FIG. 20 represents a set of test pressure signals that correspond to the set of possible pulse durations. In particular, test pressure signal 2000 is the waveform (with baseline pressure not shown) that would be expected to be received by a transducer at a location 100 feet from the reflective devices when pressure transitions 50 ms apart are created downhole (assuming a positive pulse and a 4,000 feet's speed of sound in the drilling fluid). Likewise, test pressure signal 2002 is the waveform (with baseline pressure not shown) that would be expected to be received by a transducer at a location 200 feet from the reflective devices when pressure transitions 100 ms apart are created downhole (again assuming a positive pulse and a 4,000 feet/s speed of sound in the drilling fluid).

Figure 21:
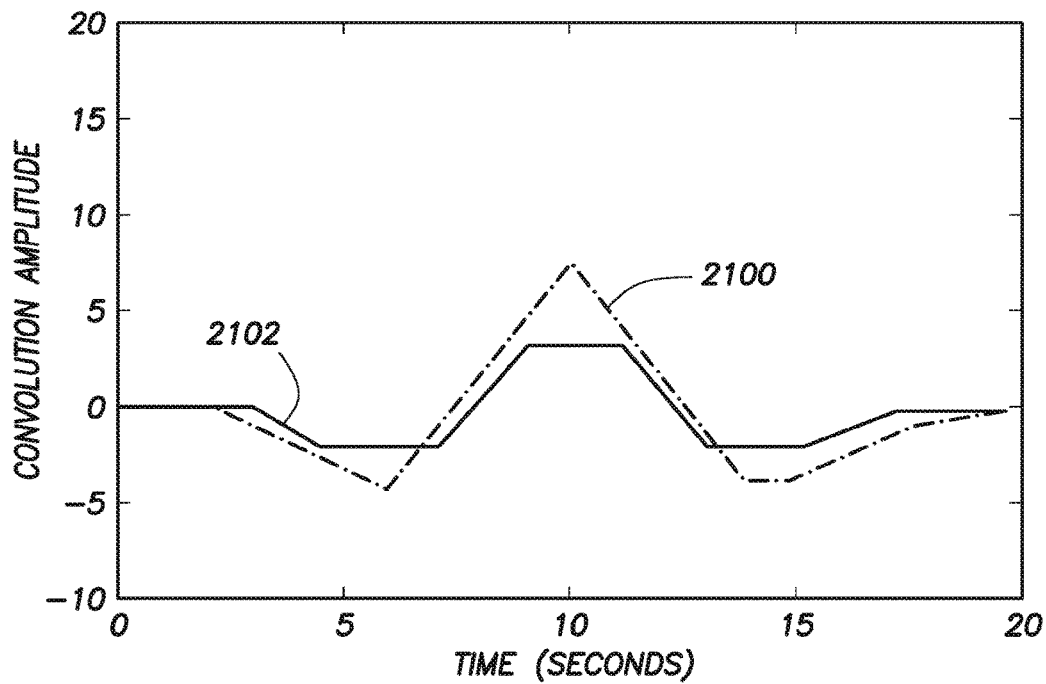
FIG. 21 shows a graph of correlation of a measured pressure signals to respective test pressure signals.
Figure 22:
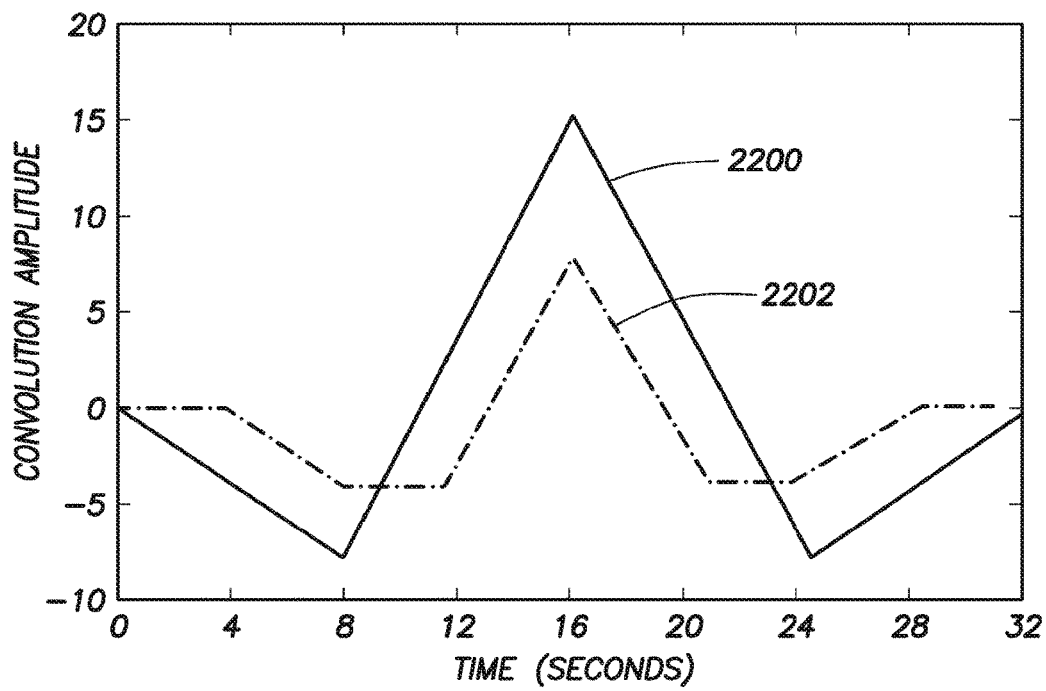
FIG. 22 shows a graph of correlation of a measured pressure signals to respective test pressure signals.

To determine which of the illustrative two possible pulses were modulated downhole, the test pressure signal 2000 is correlated to the waveform read by the transducer 100 feet from the reflective devices, and test pressure signal 2002 is correlated to the waveform read by the transducer 200 feet from the reflective devices. The pressure waveform with the highest degree of correlation to its test pressure signal thus identifies the pulse time duration modulated downhole. FIGS. 21 and 22 show illustrative results of correlating (in this particular case by convolution) received pressure waveforms to test pressure waveforms. In particular, FIG. 21 shows, for an illustrative 50 ms pressure pulse created downhole, correlation of the test pressure signal 2000 to the pressure waveform received by a transducer 100 feet from the reflective devices by dash-dot-dash line 2100, and correlation of the test pressure signal 2002 to the pressure waveform received by the transducers 200 feet from the reflective devices by solid line 2102. Because the transducer located 100 feet from the reflective devices is at the optimum location for pressure pulse of 50 ms, the highest degree of correlation is shown by the dash-dot-dash line 2100.

FIG. 22 shows, for an illustrative 100 ms pressure pulse created downhole, correlation of the test pressure signal 2000 to the pressure waveform received by a transducer 100 feet from the reflective devices by dash-dot-dash line 2202, and correlation of the test pressure signal 2002 to the pressure waveform received by the transducers 200 feet from the reflective devices by solid line 2200. Because the transducer located 200 feet from the reflective devices is at the optimum location for pressure pulse of 100 ms, the highest degree of correlation is shown by the solid line 2200.

It is noted that the illustrative test pressure signals of FIG. 20 assume a positive-pulse system. However, in cases where the telemetry module 134 is a negative-pulse system, the test pressure signals are modified (e.g., by a rotation about the time axis) to compensate. Moreover, the test pressure signals of FIG. 20 assume a particular speed of sound in the drilling fluid. Should the speed of sound change, the optimum location changes. Further still, in explaining determining the pulse time duration of a pressure pulse created downhole only two possible pulse time durations were in the predefined set; however, two members of the set were used so as not to unduly complicate the description. Any number of pulse time durations may be used in the predefined set. For example, if two bits of a datum are to be encoded in the time between pressure transitions for a pressure pulse, then the predefined set will comprise four possible pulse durations (i.e., $2^N$ members of the set, where N is the number of bits). Likewise for this example, there will be four transducers at the surface, each transducer at the optimum location for a particular pulse time duration, and there will be four test pressure signals (one for each optimum location).

Figure 23:
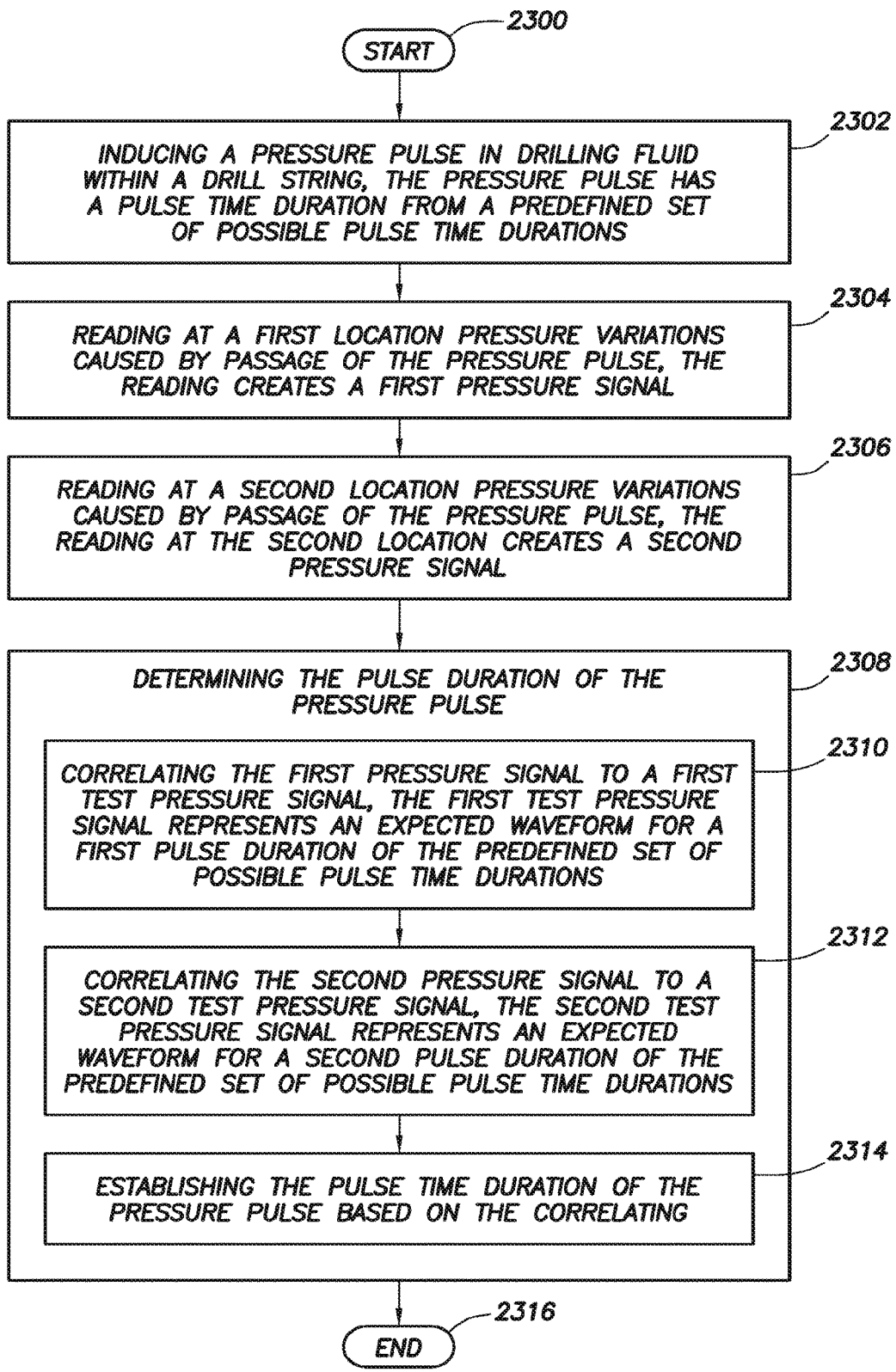
FIG. 23 shows a method in accordance with at least some embodiments.

FIG. 23 shows a method (e.g., a portion of which may be implemented as software in computer system 144) in accordance with at least some embodiments. In particular, the method starts (block 2300) and proceeds to inducing a pressure pulse in drilling fluid within a drill string, the pressure pulse has a pulse time duration from a predefined set of possible pulse time durations (block 2302). After propagating to the surface, the method involves reading at a first location pressure variations caused by passage of the pressure pulse (the reading creates a first pressure signal) (block 2304), and reading at a second location pressure variations caused by passage of the pressure pulse (the reading at the second location creates a second pressure signal) (block 2306). Based on the reading steps, the illustrative method then proceeds to determining the pulse time duration of the pressure pulse (block 2308). In at least some embodiments, determining the pulse time duration comprises: correlating the first pressure signal to a first test pressure signal, the first test pressure signal represents an expected waveform for a first pulse duration of the predefined set of possible pulse time durations (block 2310); correlating the second pressure signal to a second test pressure signal, the second test pressure signal represents an expected waveform for a second pulse duration of the predefined set of possible pulse time durations (block 2312); and establishing the pulse time duration of the pressure pulse based on the correlating (block 2314). Thereafter, the method ends (block 2316). In at least some embodiments, the correlating is by way of a convolution, but other equivalent correlation techniques may be equivalently used.

The embodiments discussed above regarding detecting pressure pulses by having a transducer at each optimum location are based on two assumptions. First, that the length of the flow pipe 118 and stand pipe 120 are long enough to accommodate a pressure transducer at each optimum location (assuming the locations dictated by the desired pressure pulses). Second, that there is no limitation regarding placement of transducers, or changing the location of transducers. However, in some situations the drilling rig may not be owned by the same company that provides the telemetry module 134, transducers (e.g., 136, 138 and 140), and surface computer 144. Thus, one may not have the ability to modify the equipment to achieve placement at each optimum location. Moreover, for longer pulse time durations (e.g., 200 ms, 300 ms), the optimum location may be beyond the length of the flow pipe 118 and stand pipe 120, such as piping arrangement of offshore oil platforms. Thus, in some situations optimum placement for desired pulse time durations may not be possible, and/or suitable pulse time durations for available transducer locations may not be suitable.

Figure 24:
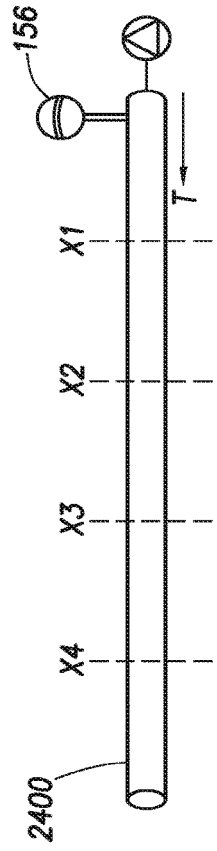
FIG. 24 shows an illustrative pipe with drilling fluid therein, and reflective devices, and detection by arrays of transducers, in accordance with at least some embodiments.

In order to address these concerns, this specification discloses embodiments of detecting pressure transitions, and thus pressure pulses, which do not necessarily utilize placement of the transducers at optimum locations. Rather, in accordance with these embodiments, an array of transducers are used (i.e., three or more transducers) and the placement of the array of transducers is arbitrary. In order to explain the array embodiments, reference is now made to FIG. 24. FIG. 24 shows a pipe 2400 that contains drilling fluid moving in the direction indicated by T. The pipe 2400 may be, for example, the flow line 118 (FIG. 1), the stand pipe 120 (FIG. 1), or some combination thereof, and thus may comprise desurger 156 and mud pump 116 (shown in symbolic form) on the upstream end. Further consider that four pressure transducers are located along the pipe 2400 (at locations X1, X2, X3 and X4), one pressure transducer at each position indicated with a dashed line. While the transducer placement is evenly spaced in FIG. 24, any physical placement will suffice, as discussed more below.

Also consider a pressure pulse (comprising a leading pressure transition followed by a trailing pressure transition) created by a telemetry module 134 that travels from the downstream portion toward the desurger 156 and mud pump 116 (i.e., opposite the direction of travel of the drilling fluid). Further consider that the pulse length is such that there is some destructive interference between the upstream traveling pressure pulse and its downstream traveling reflection at each transducer location.

Figure 25:
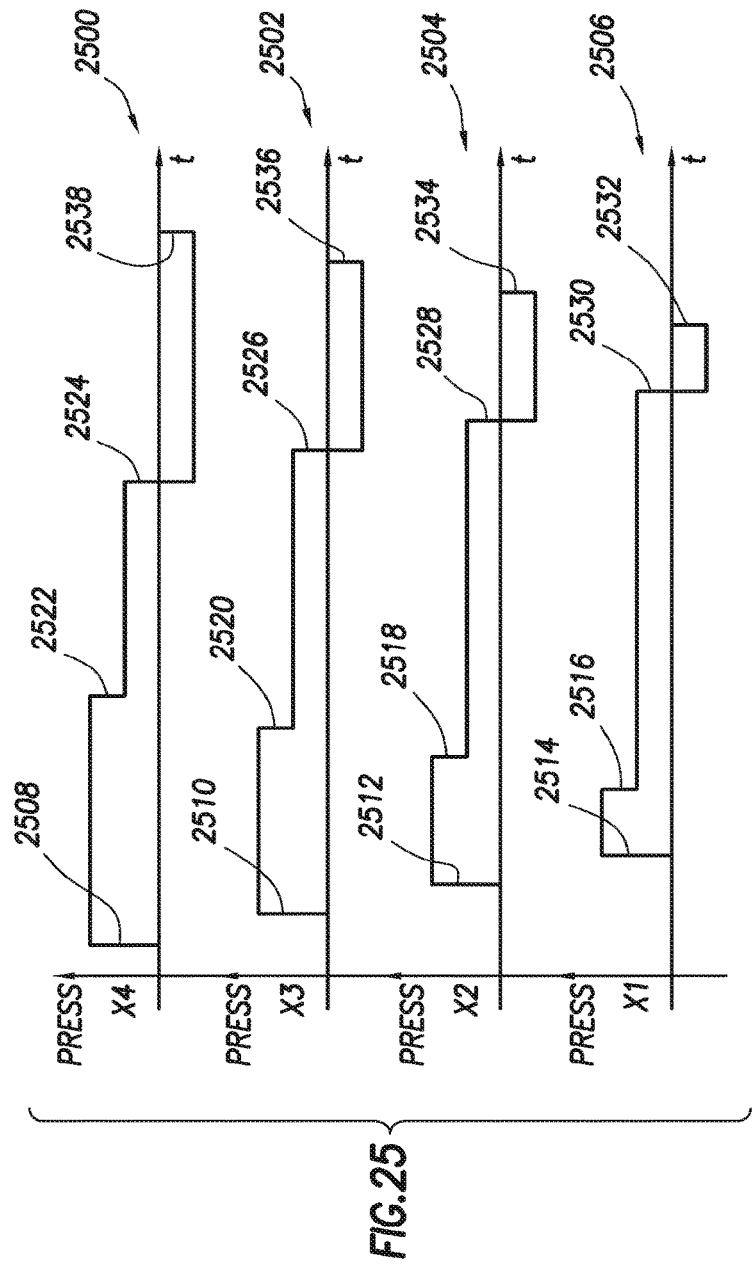
FIG. 25 shows a plurality of waveforms to discuss detection of pressure transitions in accordance with at least some embodiments.

FIG. 25 shows four illustrate plots as function of corresponding time of pressure read by each of the illustrative four transducers of FIG. 24. In particular, plot 2500 shows the pressure waveform read by a transducer at location X4. Plot 2502 shows the pressure waveform read by a transducer at location X3. Plot 2504 shows the pressure waveform read by a transducer at location X2. And plot 2506 shows the pressure waveform read by a transducer at location X1. As the illustrative pressure pulse propagates upstream the leading pressure transition first passes the transducer at location X4 (as indicated by pressure transition 2508), then the leading pressure transition passes the transducer at location X3 (as indicated by pressure transition 2510), and so on for each transducer at each location (as indicated by pressure transitions 2512 and 2514 for locations X2 and X1, respectively).

The illustrative pressure pulse reflects off the reflective devices, and the leading pressure transition of the reflected pressure pulse is read by each transducer, in this case destructively interfering. Thus, as the reflected pressure pulse propagates downstream, the leading pressure transition of the reflected pulse first passes the transducer at location X1 (indicated by pressure transition 2516), then the leading pressure transition of the reflected pulse passes the transducer at location X3 (indicated by pressure transition 2518), and so on for each transducer at each location (as indicated by pressure transitions 2520 and 2522 for locations X3 and X4, respectively).

Eventually the trailing pressure transition of the upstream traveling pressure pulses passes the transducer at location X4 (as indicated by pressure transition 2524), then the trailing pressure transition of the upstream traveling pulse passes the transducer at location X3 (as indicated by pressure transition 2526), and so on for each transducer at each location (as indicated by pressure transitions 2528 and 2530 for locations X2 and X1, respectively).

Finally, the trailing pressure transition of the reflected pulse first passes the transducer at location X1 (indicated by pressure transition 2532), then the trailing pressure transition of the reflected pulse passes the transducer at location X2 (indicated by pressure transition 2534), and so on for each transducer at each location (as indicated by pressure transitions 2536 and 2538 for locations X3 and X4, respectively).

In accordance with at least some embodiments, determining an amount of time between the leading pressure transition of the upstream traveling pressure pulse and the trailing pressure transition of the upstream traveling pressure pulse involves algorithmically shifting at least two of the pressure signals or pressure waveforms based on distance between transducers, and an expected speed of sound in the drilling fluid, such that corresponding features of the pressure waveforms are substantially aligned in time. More particularly, one transducer is selected as the "base" transducer, the pressure waveform read by the base transducer is not shifted. For the balance of the transducers, the pressure waveform read by each transducer is shifted in time by an amount that is proportional to the distance between the "base" transducer and the particular transducer, and the speed of sound in the drilling fluid. Shifting may be either back in time (e.g., to align the leading pressure transitions of the upstream traveling pulse), or the shifting may be forward in time (e.g., to align the trailing pressure transition of the upstream traveling pulse). Moreover, in other embodiments the shifting may align the pressure transitions of the reflected pressure pulse.

Figure 26:
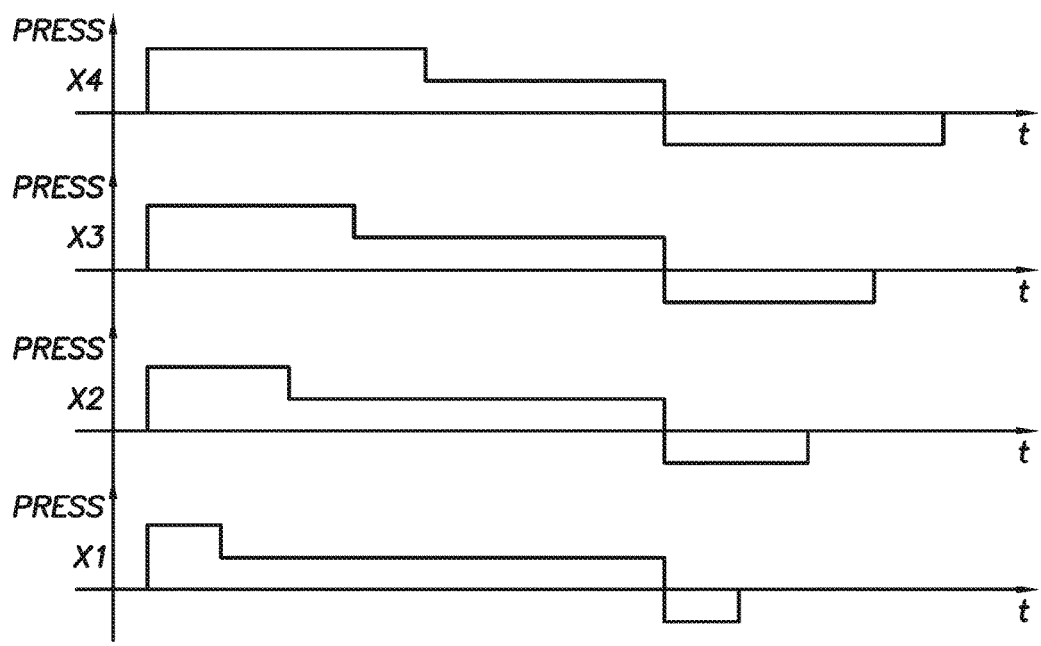
FIG. 26 shows a plurality of waveforms where at least some of the waveforms are shifted to align a particular feature, in accordance with at least some embodiments.
Figure 27:
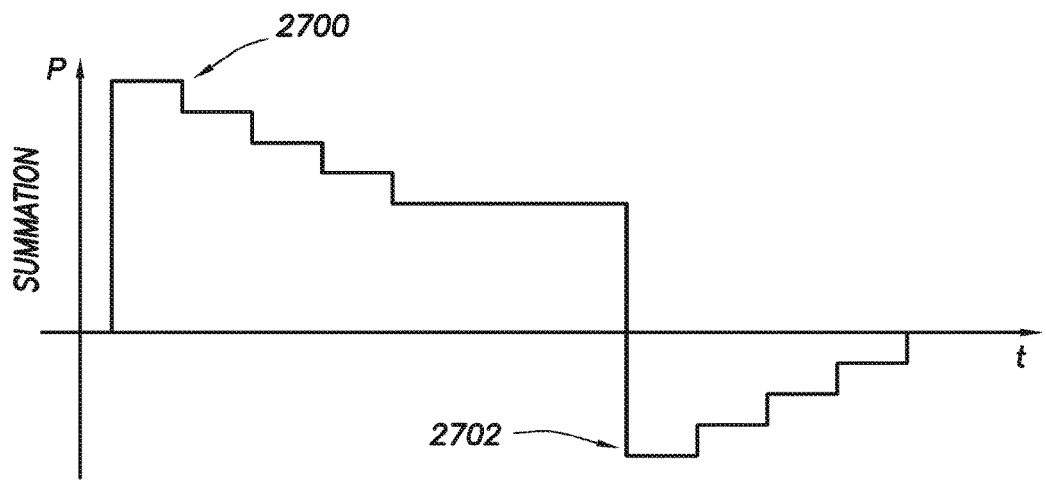
FIG. 27 shows a combined waveform in accordance with at least some embodiments.

FIG. 26 shows the illustrative pressure waveforms of FIG. 25 where the transducer at location X4 is considered the base transducer, and the remaining pressure waveforms are shifted to align the leading pressure transition in each waveform (i.e., shifted back in time). In accordance with the particular embodiment, the shifted waveforms are then correlated to determine an amount of time between the leading pressure transition and the trailing pressure transition of the upstream traveling pressure pulse. In some embodiments, the correlating is by way of summing the value of the pressure waveforms at corresponding points in time for each of the pressure waveforms. FIG. 27 shows an illustrative summation of the shifted pressure waveforms of FIG. 26. Note the large leading spike 2700 that corresponds to the leading pressure transition of the upstream traveling pressure pulse, and the large negative spike 2702 that corresponds to the trailing pressure transition of the upstream traveling pressure pulse. Thus, in accordance with the particular embodiment the determining the time between the leading transition and the trailing pressure transition involves identifying the pressure spikes 2700 and 2702 in the pressure waveform of FIG. 27, in some embodiments, the pressure waveform of FIG. 27 may be modified by taking the absolute value of the waveform to be similar to the embodiments of FIG. 9, waveform 918. In such embodiments, determining the time between pressure transitions may be based on determining the time between pressure spikes with each spike detected as an individual pressure pulse.

The illustrative waveforms in FIGS. 25-27 assume a positive-pulse system. However, in other embodiments the telemetry module 134 is a negative-pulse system, and yet the various embodiments are still operational (i.e., merely invert the waveforms in FIGS. 25-27). Moreover, in FIGS. 25-27 the drilling fluid baseline pressure is not shown so as not to unduly complicate the figures; however, in each case the waveforms shown actually "ride" the baseline pressure. FIGS. 25-27 illustrate the case of four pressure transducers in the array; however, any number of transducers being three or more may be used in accordance with these embodiments. Finally, while the waveforms of FIG. 25-27 assume reflection and destructive interference at each transducer location, the embodiments are equally applicable to situations where there is no interference between an upstream traveling pressure pulse and its reflection, as well as mixed cases (e.g., the closest transducer to the reflective devices sees interference between the upstream traveling pressure pulse and its reflection, but not other transducers).

Figure 28:
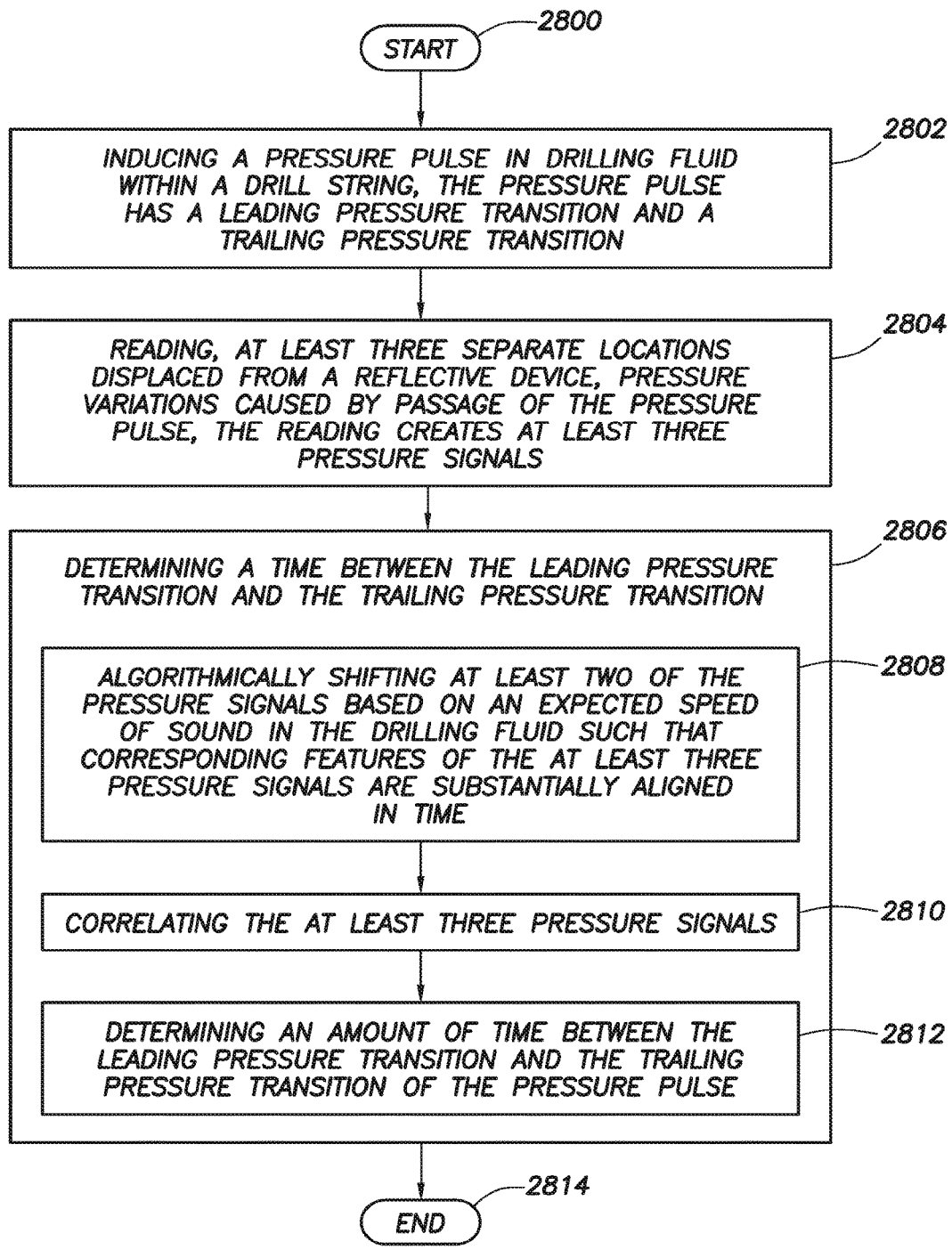
FIG. 28 shows a method in accordance with at least some embodiments.

FIG. 28 shows a method (e.g., a portion of which may be implemented as software in computer system 144) in accordance with at least some embodiments. In particular, the method starts (2800) and proceeds to inducing a pressure pulse in drilling fluid within a drill string, the pressure pulse has a leading pressure transition and a trailing pressure transition (block 2802). Next, the illustrative method involves reading, at three or more separate locations displaced from a reflective device, pressure variations caused by passage of the pressure pulse, the reading creates at least three pressure signals (block 2804). Then method proceeds to determining a time between the leading pressure transition and the trailing pressure transition (block 2806). In at least some embodiments, determining a time between the leading pressure transition and the trailing pressure transition involves: algorithmically shifting at least two of the pressure signals based on an expected speed of sound in the drilling fluid such that corresponding features of the at least three pressure signals are substantially aligned in time (block 2808); and then correlating the at least three pressure signals (block 2810); and determining an amount of time between the leading pressure transition and the trailing pressure transition of the pressure pulse (block 2812). Thereafter, the illustrative method ends (block 2814).

In accordance with at least some embodiments, algorithmically shifting at least two of the pressure signals involves shifting at least two of the pressure signals back in time such that leading pressure transitions among the pressure signals are substantially aligned. In other embodiments, algorithmically shifting at least two of the pressure signals involves shifting at least two of the pressure signals forward in time such that trailing pressure transitions among the pressure signals are substantially aligned. Moreover, in some embodiments correlating the pressure signals involves summing corresponding points in time of the pressure signals, and thereby creating a summed signal.

The various embodiments discussed to this point have been with respect to communication between the telemetry module 134 and the surface devices. However, the same data encoding and pressure pulse transition techniques may be used in communication from the surface to the downhole devices. For example, pressure pulses may be created at the surface and allowed to propagate downhole. A single pressure transducer co-located with the downhole tools 132 and telemetry module 134, or an array of such transducers, may be used to detect pressure pulses in the same manner as discussed above.

The specification discusses in many locations transducers (such as transducers 136, 138 and 140) coupled to the flow line 118 and/or riser 120. In some embodiments, the transducers are pressure transducers or pressure transmitters that are coupled to the piping in such a way as to be in fluidic communication with the drilling fluid. Such transducers may create an analog representation of the pressure of the drilling fluid, or a series of digital values (each correlated to time) representative of the pressure in the drilling fluid. However, other types of transducer devices that produce output signals proportional to drilling fluid pressure, changes in drilling fluid pressure as sensed by minute expansion and/or contraction of the piping, and/or transducers that sense drilling fluid may be equivalently used.

Figure 29:
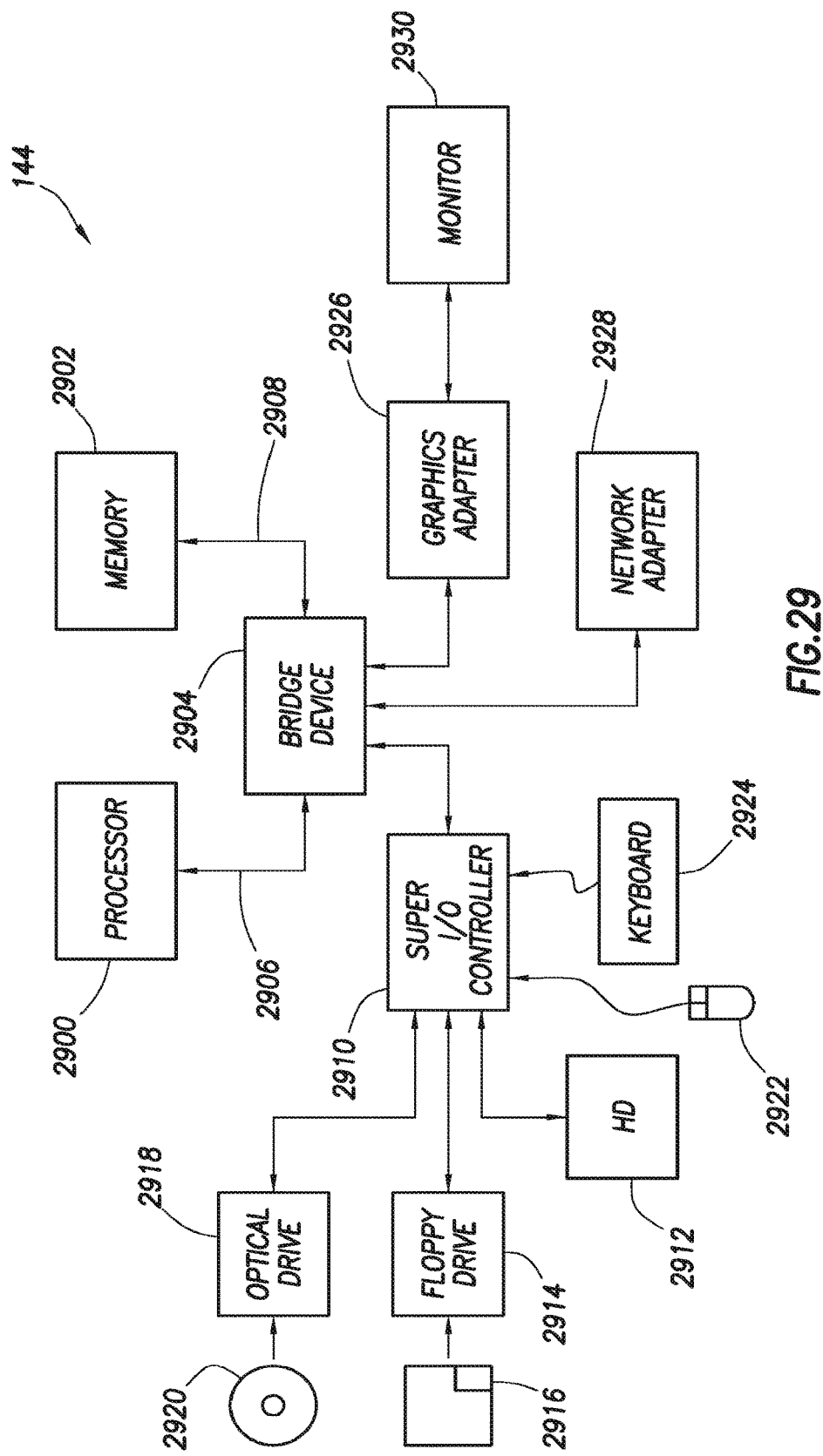
FIG. 29 shows a computer system in accordance with at least some embodiments.

FIG. 29 shows a set of illustrative internal components of computer system 144 (FIG. 1). In particular, the computer system 144 comprises a processor 2900 coupled to a memory device 2902 by way of a bridge device 2904. Although only one processor 2900 is shown, multiple processor systems, and systems where the "processor" has multiple processing cores, may be equivalently implemented. The processor 2900 couples to the bridge device 2904 by way of a processor bus 2906, and memory 2902 couples to the bridge device 2904 by way of a memory bus 2908. Memory 2902 is any volatile or any non-volatile memory device, or array of memory devices, such as random access memory (RAM) devices, dynamic RAM (DRAM) devices, static DRAM (SDRAM) devices, double-data rate DRAM (DDR DRAM) devices, or magnetic RAM (MRAM) devices.

The bridge device 2904 comprises a memory controller and asserts control signals for reading and writing of the memory 2902, the reading and writing both by processor 2900 and by other devices coupled to the bridge device 2904 (i.e., direct memory access (DMA)). The memory 2902 is the working memory for the processor 2900, which stores programs executed by the processor 2900 and which stores data structures used by the programs executed on the processor 2900. In some cases, the programs held in the memory 2902 are copied from other devices (e.g., hard drive 2912 discussed below or from other non-volatile memory) prior to execution.

Bridge device 2904 not only bridges the processor 2900 to the memory 2902, but also bridges the processor 2900 and memory 2902 to other devices. For example, the illustrative computer system 144 may comprise an input/output (I/O) controller 2910 which interfaces various I/O devices to the processing unit 2900. In the illustrative computer system 144, the I/O controller 2910 enables coupling and use of non-volatile memory devices such as a hard drive (HD) 2912, "floppy" drive 2914 (and corresponding "floppy disk" 2916), an optical drive 2918 (and corresponding optical disk 2920) (e.g., compact disk (CD), digital versatile disk (DVD)), and also enables coupling of a pointing device or 2922, and a keyboard 2924.

Still referring to FIG. 29, the bridge device 2904 further bridges the processor 2900 and memory 2902 to other devices, such as a graphics adapter 2926 and communication port or network adapter 2928. Graphics adapter 2926 is any suitable graphics adapter for reading display memory and driving a display device or monitor 2930 with graphic images represented in the display memory. Network adapter 550 enables the processing unit 500 to communicate with other computer systems over a computer network 120.

Programs implemented and executed to read pressure signals detected by transducers coupled to the flow line 118 and/or riser 120, and to determine the time between pressure pulses and/or the time between pressure transitions convert the illustrative computer system of FIG. 29 into a special purpose machine to perform the illustrative methods discussed above. Moreover, the programs that turn computer system 144 into a special purpose machine may be stored and/or executed from any of the computer-readable storage mediums illustrated (e.g., memory 2902, optical device 2920, "floppy" device 2916 or hard drive 2912).

From the description provided herein, those skilled in the art are readily able to combine software created as described with appropriate computer hardware to create a special-purpose computer system and/or other computer subcomponents in accordance with the various embodiments, to create a special-purpose computer system and/or computer subcomponents for carrying out the methods for various embodiments, and/or to create a computer-readable storage medium or mediums for storing a software program, that, when executed by a processor, reverse the processor and the machine in which the processor operates into a special-purpose of machine.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A telemetry method comprising:
    inducing a pressure pulse in drilling fluid within a drill string, the pressure pulse has a pulse time duration from a predefined set of possible pulse time durations;
    reading, at a first location displaced from a reflective device, pressure variations caused by passage of the pressure pulse, the reading creates a first pressure signal;
    reading, at a second location displaced from the reflective device, pressure variations caused by passage of the pressure pulse, the reading at the second location creates a second pressure signal;
    determining the pulse duration of the pressure pulse by:
        correlating the first pressure signal to a first test pressure signal, the first test pressure signal represents an expected waveform for a first pulse duration of the predefined set of possible pulse time durations;
        correlating the second pressure signal to a second test pressure signal, the second test pressure signal represents an expected waveform for a second pulse duration of the predefined set of possible pulse time durations; and
        establishing the pulse time duration of the pressure pulse based on the correlating; and using the pulse time duration of the pressure pulse to perform a telemetry operation.

2. The telemetry method of claim 1 wherein establishing the pulse duration further comprises establishing the pulse duration as the pulse duration with the highest correlation.

3. The telemetry method of claim 1 further comprising:
wherein inducing further comprises inducing by a device down hole; and
wherein reading at the first and second locations further comprises reading at the first and second locations at the surface.

4. The telemetry method of claim 3 further comprising, prior to inducing, sending an indication of the predefined set of possible pulse time durations, the indication based on available location for pressure transducers at the surface.

5. The telemetry method of claim 1 further comprising:
wherein the predefined set comprises a first pulse time duration that corresponds to a first pulse length and a second pulse time duration that corresponds to a second pulse length;
wherein reading at the first location further comprises reading at a location that is substantially half the first pulse length from the reflective device; and
wherein reading at the second location further comprises reading at a location that is substantially half the second pulse length from the reflective device.

6. A telemetry system comprising:
a down hole device that creates a pressure pulse in drilling fluid within a drill string, the pressure pulse has a pulse length selected from a predefined set of pulse lengths that comprises a first pulse length and a second pulse length longer than the first pulse length, and the pulse length selected based on the data encoded in the pressure pulse;
a first transducer that reads pressure variations in the drilling fluid and thereby creates a first pressure signal, the first transducer at a first location that is substantially half the first pulse length from a reflective device;
a second transducer that reads pressure variations in the drilling fluid to create a second pressure signal, the second transducer at a second location that is substantially half the second pulse length from a reflective device;
a computer system coupled to the first and second transducers, the computer system has a processor and a memory device coupled to the processor, and the memory device stores a program that, when executed by the processor, causes the processor to:
read the first and second pressure signals;
correlate the first pressure signal to a first test pressure signal, the first test pressure signal represents an expected waveform at the first location if the pressure pulse has the first pulse length;
correlate the second pressure signal to a second test pressure signal, the second test pressure signal represents an expected waveform at the second location if the pressure pulse has the second pulse length; and
determine the pulse length based on the correlating of the first and second pressure signals to the respective first and second test pressure signals.

7. The telemetry system of claim 6 wherein determining the pulse length further comprises determining the pulse length of the pressure pulse as a pulse length associated with the first or second set of test pressure signals with the highest correlation.

8. The telemetry system of claim 6 further comprising:
wherein the predefined set of pulse length further comprises a third pulse length longer than the second pulse length;
a third transducer that reads pressure variations in the drilling fluid to create a third pressure signal, the third transducer at a third location that is substantially half the third pulse length from a reflective device; and
said memory comprises the program that, when executed by the processor, further causes the processor to:
correlate the third pressure signal to a third test pressure signal, the third test pressure signal represents an expected waveform at the third location if the pressure pulse has the third pulse length; and
determine the pulse length based on the correlating of the first, second and third pressure signals to the respective first, second and third test pressure signals.

* * * * *

UNITED STATES PATENT AND TRADEMARK OFFICE
CERTIFICATE OF CORRECTION

PATENT NO. : 10,472,956 B2
APPLICATION NO. : 15/468554
DATED : November 12, 2019
INVENTOR(S) : Bipin K. Pillai et al.

Page 1 of 1

It is certified that error appears in the above-identified patent and that said Letters Patent is hereby corrected as shown below:

In the Specification

In Column 10, Line 18: "MEN-TIME" should be --MIN-TIME--.

Signed and Sealed this
Seventeenth Day of March, 2020

Andrei Iancu
*Director of the United States Patent and Trademark Office*